United States Patent
Jornod et al.

(10) Patent No.: US 11,641,244 B2
(45) Date of Patent: May 2, 2023

(54) METHOD, APPARATUS AND COMPUTER PROGRAM FOR PREDICTING A FUTURE QUALITY OF SERVICE OF A WIRELESS COMMUNICATION LINK

(71) Applicant: VOLKSWAGEN AKTIENGESELLSCHAFT, Wolfsburg (DE)

(72) Inventors: Guillaume Jornod, Berlin (DE); Andreas Pfadler, Berlin (DE)

(73) Assignee: Volkswagen Aktiengesellschaft

(*) Notice: Subject to any disclaimer, the term of this patent is extended or adjusted under 35 U.S.C. 154(b) by 121 days.

(21) Appl. No.: 17/203,827

(22) Filed: Mar. 17, 2021

(65) Prior Publication Data
US 2021/0297171 A1  Sep. 23, 2021

(30) Foreign Application Priority Data
Mar. 20, 2020 (EP) .................................. 20164409

(51) Int. Cl.
*H04B 17/373* (2015.01)
*H04B 17/391* (2015.01)
*G06N 20/00* (2019.01)

(52) U.S. Cl.
CPC .......... *H04B 17/373* (2015.01); *G06N 20/00* (2019.01); *H04B 17/391* (2015.01)

(58) Field of Classification Search
CPC .... H04B 17/373; H04B 17/391; G06N 20/00; G06N 3/08; H04W 4/46; H04W 24/00;
(Continued)

(56) References Cited

U.S. PATENT DOCUMENTS

| 8,423,066 | B2 | 4/2013 | DeLuca |
| 2016/0196527 | A1 | 7/2016 | Bose et al. |

(Continued)

FOREIGN PATENT DOCUMENTS

| EP | 3621274 A1 | 3/2020 |
| EP | 3621323 A1 | 3/2020 |

(Continued)

OTHER PUBLICATIONS

Jornod et al.; Prediction of Packet Inter-Reception Time for Platooning using Conditional Exponential Distribution 2019 16th International Symposium on Wireless Communication Systems (ISWCS); IEEE; Aug. 27, 2019; pp. 265-270.
(Continued)

*Primary Examiner* — Lana N Le
(74) *Attorney, Agent, or Firm* — Barnes & Thornburg, LLP

(57) ABSTRACT

An apparatus, a method and a computer program for predicting a future quality of service of a wireless communication link based on a predicted future environmental model that is predicted using a time-series projection. The method includes determining environmental models of one or more active transceivers in the environment of the mobile transceiver over points in time, determining a predicted future environmental model of the one or more active transceivers at a point in time of the future using a time-series projection of environmental models, predicting the future quality of service of the wireless communication link for point in time of the future using a machine-learning model. The machine-learning model is trained to provide information on a predicted quality of service for a given environmental model, and the predicted future environmental model is used as input to the machine-learning model.

27 Claims, 7 Drawing Sheets

(58) Field of Classification Search
CPC ....... H04W 4/40; H04W 24/10; H04W 4/023; H04W 64/00; H04W 24/02; H04W 4/00; H04W 16/22; H04W 4/025; H04W 36/30; H04W 40/12; H04W 72/121; H04W 28/0268; H04W 88/02; H04W 28/0226; H04W 28/0263; H04W 28/0958; H04W 40/20; H04L 41/142; H04L 41/147
See application file for complete search history.

(56) References Cited

U.S. PATENT DOCUMENTS

| | | | |
|---|---|---|---|
| 2017/0124487 A1* | 5/2017 | Szeto | G06F 11/1448 |
| 2017/0272972 A1 | 9/2017 | Egner et al. | |
| 2019/0036630 A1* | 1/2019 | Svennebring | H04W 40/12 |
| 2019/0095961 A1* | 3/2019 | Wu | G06Q 30/0255 |
| 2019/0138934 A1* | 5/2019 | Prakash | H04L 43/08 |
| 2019/0156247 A1* | 5/2019 | Faulhaber, Jr. | G06N 3/08 |
| 2019/0319840 A1 | 10/2019 | Cheng et al. | |
| 2019/0319868 A1 | 10/2019 | Svennebring et al. | |
| 2020/0195539 A1* | 6/2020 | Sivaraj | H04W 28/0992 |
| 2021/0110323 A1* | 4/2021 | Munoz | G06Q 10/06311 |
| 2021/0326680 A1* | 10/2021 | Chaaraoui | H04L 41/16 |
| 2021/0383202 A1* | 12/2021 | Ginerica | G06N 3/045 |
| 2022/0399936 A1* | 12/2022 | Arksey | G06T 7/73 |

FOREIGN PATENT DOCUMENTS

| | | |
|---|---|---|
| WO | 2019180700 A1 | 9/2019 |
| WO | WO-2021209803 A1 * | 10/2021 |

OTHER PUBLICATIONS

Jornod et al.; Packet Inter-Reception Time Modeling for High-Density Platooning in Varying Surrounding Traffic Density; 28th IEEE Eur. Conf. Net. Commun. (EuCNC); 2019; pp. 187-192.

Ma et al.; Performance and Reliability of DSRC Vehicular Safety Communication: A Formal Analysis; EURASIP Journal on Wireless Communications and Networking; 2009; vol. 2009; Aricle ID 969164.

Renda et al.; IEEE 802.11p VANets: Experimental Evaluation of Packet Inter-Reception Time; Comput. Commun 2016; vol. 75; pp. 26-38.

Search Report for European Patent Application No. 20164409.3; dated Sep. 8, 2020.

* cited by examiner

| time | dst | src | size | pir | dist | d30 | d60 | d90 | d120 | d150 | d180 | d210 | d240 | d270 | d300 | d330 | d360 | d390 |
|---|---|---|---|---|---|---|---|---|---|---|---|---|---|---|---|---|---|---|
| 12:40.0 | 2 | 4 | 700 | 0.05 | 84.32855 | 0 | 2 | 1 | 1 | 3 | 3 | 1 | 8 | 8 | 6 | 11 | 7 | 8 |
| 12:40.5 | 2 | 4 | 700 | 0.05 | 84.37583 | 0 | 2 | 1 | 1 | 4 | 3 | 2 | 8 | 8 | 7 | 7 | 8 | 7 |
| 12:41.0 | 2 | 4 | 700 | 0.05 | 84.44204 | 0 | 2 | 1 | 1 | 4 | 2 | 9 | 10 | 7 | 8 | 4 | 8 | 6 |
| 12:41.5 | 2 | 4 | 700 | 0.05 | 84.67431 | 0 | 2 | 1 | 2 | 3 | 2 | 9 | 10 | 8 | 7 | 1 | 7 | 4 |
| 12:42.0 | 2 | 4 | 700 | 0.05 | 84.84684 | 0 | 2 | 1 | 2 | 3 | 3 | 9 | 10 | 8 | 6 | 0 | 6 | 6 |
| 12:42.5 | 2 | 4 | 700 | 0.05 | 84.99032 | 0 | 2 | 1 | 2 | 3 | 8 | 7 | 8 | 8 | 6 | 1 | 4 | 6 |
| 12:43.0 | 2 | 4 | 700 | 0.05 | 85.06439 | 0 | 2 | 1 | 2 | 3 | 11 | 11 | 4 | 8 | 4 | 1 | 2 | 5 |
| 12:43.5 | 2 | 4 | 700 | 0.05 | 85.10355 | 0 | 2 | 1 | 2 | 3 | 11 | 12 | 4 | 8 | 3 | 1 | 2 | 4 |
| 12:44.0 | 2 | 4 | 700 | 0.05 | 85.12935 | 0 | 2 | 2 | 1 | 10 | 10 | 12 | 3 | 9 | 2 | 1 | 1 | 4 |
| 12:44.5 | 2 | 4 | 700 | 0.05 | 85.19334 | 0 | 2 | 2 | 1 | 10 | 10 | 10 | 8 | 8 | 1 | 1 | 1 | 2 |
| 12:45.0 | 2 | 4 | 700 | 0.05 | 85.2658 | 0 | 2 | 2 | 8 | 9 | 10 | 5 | 9 | 8 | 0 | 1 | 1 | 3 |
| 12:45.5 | 2 | 4 | 700 | 0.053 | 85.45996 | 0 | 2 | 3 | 8 | 7 | 11 | 5 | 9 | 7 | 0 | 1 | 1 | 3 |
| 12:46.0 | 2 | 4 | 700 | 0.05 | 85.76149 | 0 | 2 | 3 | 8 | 9 | 8 | 4 | 9 | 7 | 2 | 1 | 2 | 3 |
| 12:46.5 | 2 | 4 | 700 | 0.1 | 86.00825 | 0 | 2 | 4 | 4 | 9 | 4 | 9 | 8 | 6 | 2 | 2 | 2 | 3 |
| 12:47.0 | 2 | 4 | 700 | 0.1 | 86.18808 | 0 | 2 | 9 | 8 | 6 | 3 | 9 | 8 | 3 | 4 | 2 | 3 | 4 |
| 12:47.5 | 2 | 4 | 700 | 0.1 | 86.28447 | 0 | 2 | 9 | 8 | 3 | 5 | 9 | 8 | 3 | 4 | 3 | 4 | 4 |
| 12:48.0 | 2 | 4 | 700 | 0.1 | 86.33546 | 1 | 4 | 6 | 8 | 3 | 9 | 7 | 8 | 2 | 4 | 3 | 3 | 3 |
| 12:48.5 | 2 | 4 | 700 | 0.053 | 86.34076 | 1 | 9 | 9 | 8 | 2 | 9 | 6 | 8 | 3 | 4 | 3 | 3 | 2 |
| 12:49.0 | 2 | 4 | 700 | 0.1 | 86.33509 | 1 | 9 | 9 | 3 | 6 | 9 | 10 | 2 | 3 | 4 | 3 | 3 | 2 |
| 12:49.5 | 2 | 4 | 700 | 0.1 | 86.53086 | 3 | 8 | 9 | 1 | 6 | 9 | 11 | 2 | 2 | 4 | 2 | 4 | 2 |

| time | dst | src | size | pir | dist | d30 | d60 | d90 | d120 | d150 | d180 | d210 | d240 | d270 | d300 | d330 | d360 | d390 |
|---|---|---|---|---|---|---|---|---|---|---|---|---|---|---|---|---|---|---|
| 12:50.0 | 2 | 4 | 700 | 0.051 | 86.81971 | 3 | 6 | 8 | 1 | 10 | 6 | 11 | 3 | 3 | 4 | 3 | 5 | 2 |
| 12:50.5 | 2 | 4 | 700 | 0.051 | 87.04843 | 3 | 10 | 4 | 1 | 10 | 10 | 6 | 3 | 3 | 3 | 3 | 5 | 2 |
| 12:51.0 | 2 | 4 | 700 | 0.051 | 87.21254 | 3 | 10 | 2 | 8 | 10 | 10 | 3 | 4 | 3 | 3 | 3 | 4 | 3 |
| 12:51.5 | 2 | 4 | 700 | 0.054 | 87.2969 | 3 | 9 | 2 | 9 | 7 | 9 | 3 | 3 | 3 | 4 | 3 | 3 | 3 |
| 12:52.0 | 2 | 4 | 700 | 0.1 | 87.32558 | 3 | 9 | 3 | 9 | 9 | 3 | 3 | 3 | 3 | 5 | 3 | 3 | 3 |
| 12:52.5 | 2 | 4 | 700 | 0.1 | 87.32916 | 3 | 8 | 10 | 8 | 9 | 3 | 3 | 2 | 2 | 5 | 3 | 2 | 3 |
| 12:53.0 | 2 | 4 | 700 | 0.1 | 87.32259 | 5 | 8 | 10 | 8 | 10 | 3 | 3 | 2 | 2 | 5 | 3 | 3 | 3 |
| 12:53.5 | 2 | 4 | 700 | 0.1 | 87.2715 | 4 | 10 | 12 | 11 | 2 | 4 | 2 | 2 | 2 | 4 | 3 | 4 | 4 |
| 12:54.0 | 2 | 4 | 700 | 0.1 | 87.2002 | 2 | 13 | 10 | 11 | 2 | 4 | 2 | 1 | 1 | 4 | 4 | 4 | 3 |
| 12:54.5 | 2 | 4 | 700 | 0.054 | 87.12583 | 2 | 13 | 12 | 9 | 2 | 4 | 2 | 3 | 2 | 4 | 5 | 4 | 3 |
| 12:55.0 | 2 | 4 | 700 | 0.1 | 87.05409 | 4 | 11 | 12 | 10 | 3 | 5 | 3 | 4 | 2 | 4 | 5 | 3 | 2 |
| 12:55.5 | 2 | 4 | 700 | 0.1 | 86.98699 | 6 | 9 | 11 | 9 | 7 | 4 | 2 | 4 | 1 | 2 | 4 | 3 | 3 |
| 12:56.0 | 2 | 4 | 700 | 0.101 | 86.92065 | 6 | 12 | 12 | 5 | 11 | 3 | 3 | 2 | 1 | 4 | 3 | 4 | 2 |
| 12:56.5 | 2 | 4 | 700 | 0.053 | 86.84856 | 6 | 12 | 6 | 9 | 11 | 3 | 2 | 3 | 2 | 4 | 4 | 2 | 2 |
| 12:57.0 | 2 | 4 | 700 | 0.053 | 86.77679 | 6 | 11 | 4 | 11 | 10 | 7 | 2 | 2 | 2 | 3 | 3 | 3 | 3 |
| 12:57.5 | 2 | 4 | 700 | 0.1 | 86.71378 | 5 | 11 | 4 | 10 | 9 | 11 | 2 | 2 | 4 | 3 | 4 | 1 | 2 |
| 12:58.0 | 2 | 4 | 700 | 0.101 | 86.65902 | 5 | 12 | 4 | 4 | 13 | 12 | 2 | 1 | 4 | 3 | 3 | 1 | 3 |
| 12:58.5 | 2 | 4 | 700 | 0.101 | 86.60961 | 5 | 11 | 12 | 2 | 13 | 11 | 10 | 2 | 3 | 3 | 2 | 1 | 3 |
| 12:59.0 | 2 | 4 | 700 | 0.2 | 86.56052 | 6 | 9 | 13 | 2 | 11 | 10 | 11 | 1 | 2 | 3 | 2 | 1 | 2 |
| 12:59.5 | 2 | 4 | 700 | 0.101 | 86.5157 | 3 | 10 | 10 | 4 | 4 | 10 | 10 | 3 | 3 | 3 | 2 | 2 | 1 |

Fig. 2B

METHOD, APPARATUS AND COMPUTER PROGRAM FOR PREDICTING A FUTURE QUALITY OF SERVICE OF A WIRELESS COMMUNICATION LINK

PRIORITY CLAIM

This patent application claims priority to European Patent Application No. 20164409.3, filed 20 Mar. 2020, the disclosure of which is incorporated herein by reference in its entirety.

SUMMARY

Illustrative embodiments relate to an apparatus, a method and a computer program for predicting a future quality of service of a wireless communication link based on a predicted future environmental model that is predicted using a time-series projection.

BRIEF DESCRIPTION OF THE DRAWINGS

Disclosed will be described by way of example only with reference to the figures, in which:

FIG. 2A shows a first part of a table of a development of a quality of service property in relation to an environmental model over time;

FIG. 2B shows a continuation of the table of FIG. 2A;

DETAILED DESCRIPTION

Figure 1A:
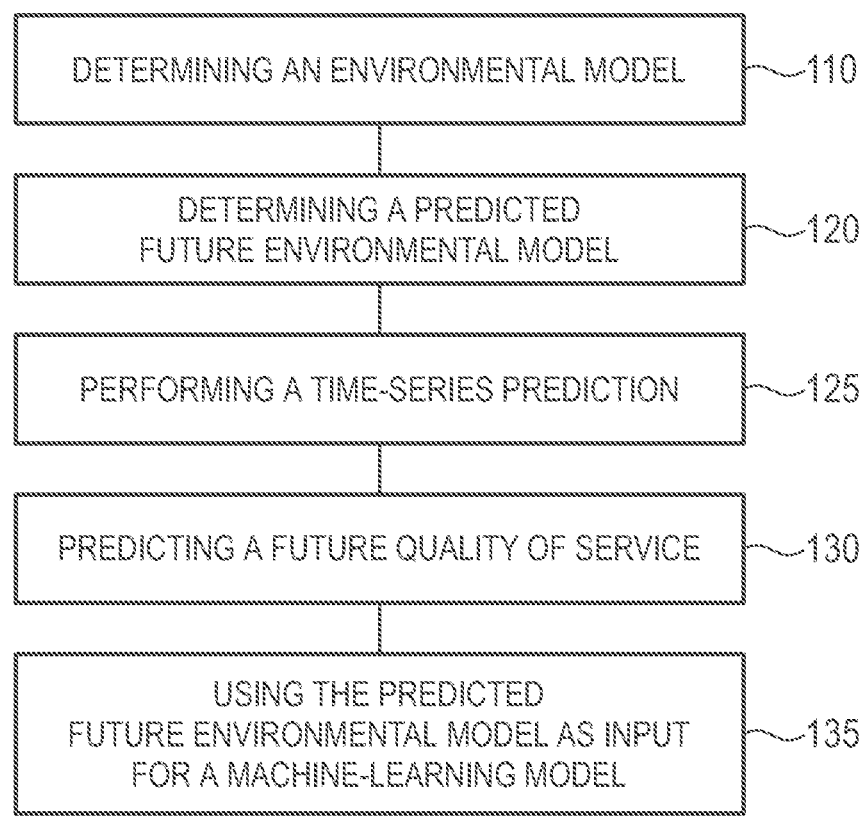
FIG. 1A shows a flow chart of an exemplary embodiment of a method for predicting a future quality of service of a wireless communication link between a mobile transceiver and a further mobile transceiver.

The communication between mobile transceivers is a field of research and development. For example, in vehicular applications, research is being performed to improve both the performance and the predictability of wireless communication between transportation vehicles in a constantly changing environment. For example, in the scope of cooperative driving, the prediction of the future quality of service (QoS) of a wireless communication link between two transportation vehicles improves the functioning of the vehicular application when the QoS conditions vary. Indeed, when no predictive QoS (PQoS) is provided, the application might only react to variations and might therefore be limited to lower bound performances of the communication system. PQoS systems can run on the transportation vehicles, the communication nodes, with radio access technologies (RATs) such as LTE-V (Long Term Evolution for Vehicular communication) or 5G-V2X (5th generation mobile communication system for Vehicle-to-Anything communication) in their standalone modes, or IEEE 802.11p (a standard of the Institute of Electrical and Electronics Engineers). Combinations of these technologies can also be applied in multi-RAT systems. In such PQoS systems, transportation vehicles can exchange information about the communication surrounding environment to provide PQoS.

In the literature, channel models (semi stochastic, like spatial channel model (SCM), and deterministic like ray tracing) provide an estimation of path loss and interference from other communicating nodes. Statistical models may provide an idea about some mapping between the surrounding transportation vehicles and the quality of service. An example is shown in "Performance and Reliability of DSRC Vehicular Safety Communication: A Formal Analysis and IEEE 802.11p VANets: Experimental evaluation of packet inter-reception time provide such model" by Ma, Chen and Refai. The paper "Prediction of Packet Inter Reception Time for Platooning using Conditional Exponential Distribution" by Jornod, El Assad, Kwoczek and Kürner provides a statistical link between surrounding density and packet inter-reception time. It also shows a way to divide the surrounding environment in circular zones to represent traffic densities around the transmitter. It uses the distance between the transceivers to estimate the QoS of the link.

There may be a desire for an improved concept for the prediction of a quality of service of wireless communication links between transportation vehicles.

Disclosed embodiments are based on the finding that previous approaches for predicting the quality of service are focused on providing a prediction for a single point in time, instead of using a prediction approach that tracks a gradual development of the environment of the mobile transceiver, and thus the gradual development of the quality of service of a wireless communication link between the mobile transceiver and another mobile transceiver. In exemplary embodiments of the present disclosure, a future environmental model of active transceivers surrounding the mobile transceiver is predicted by performing a time-series projection that is based on previously generated environmental models. Based on the environmental model that is predicted for a point (or multiple points) in time of the future, the quality of service at the point or points in time of the future is determined using a machine-learning model. Thus, by using a time-series projection on the environmental models, a development of the quality of service of the wireless communication link, as influenced by the changes in the environment, is predicted.

Disclosed embodiments provide a method for predicting a future quality of service of a wireless communication link between a mobile transceiver and a further mobile transceiver. The method comprises determining a plurality of environmental models of one or more active transceivers in the environment of the mobile transceiver over a plurality of points in time. The method comprises determining a predicted future environmental model of the one or more active transceivers at a point in time of the future using a time-series projection on the plurality of environmental models. The method comprises predicting the future quality of service of the wireless communication link for point in time of the future using a machine-learning model. The machine-learning model is trained to provide information on a predicted quality of service for a given environmental model. The predicted future environmental model is used as input to the machine-learning model. By performing the time-series projection, the radio environment of the mobile transceiver is modeled at the point in time of the future. This predicted future environmental model may in turn be used to predict the future quality of service of the wireless link, via the machine-learning model.

In various exemplary embodiments, the time-series projection is performed based on a statistical fitting function or based on a time autocorrelation function. Such statistics-based approaches have a low computational overhead.

Alternatively, the time-series projection may be performed using a further machine-learning model. Machine-learning-based time-series projections may be useful in scenarios with a larger number of interrelated features, at a higher computational effort.

For example, the time-series projection may be determined such, that a progression of the environmental models towards the predicted future environmental model is predicted. In other words, the data underlying the plurality of environmental models may be extrapolated towards the predicted future environmental model.

For example, the time-series projection may yield the predicted future environmental model. The future quality of service is predicted based on the predicted future environmental model. In other words, the time-series projection might not be applied to the quality of service itself, but on the environmental model underlying the prediction of the future quality of service.

In various exemplary embodiments, the future quality of service of the wireless communication link is predicted for at least two points in time of the future. For example, the predicted future environmental model may be predicted for the at least two points in time of the future, and subsequently used to predict the future quality of service for the at least two points in time of the future.

For example, the future quality of service of the wireless communication link may be predicted for the at least two points in time of the future by determining the predicted future environmental model of the one or more active transceivers at the at least two points in time of the future, and using the predicted future environmental model of the one or more active transceivers at the at least two points in time of the future as inputs for the machine-learning model. Thus the prediction of the future quality of service may be provided over a time-line of points in time of the future.

In disclosed embodiments, the plurality of environmental models of the one or more active transceivers are determined over a plurality of points in time. The method may comprise determining a quality of service of the wireless communication link at the plurality of points in time. The method may comprise training the machine-learning model using the plurality of environmental models at the plurality of points of time as training input and the quality of service of the wireless communication link at the corresponding plurality of points in time as training output of the training of the machine-learning model. Thus, the machine-learning model may be trained on the environmental models being generated by and/or for the mobile transceiver.

For example, the machine-learning model maybe trained to implement a regression algorithm. Regression-based machine-learning algorithms may be used to determine a numerical value (within a range), such as the future quality of service.

In various exemplary embodiments, the machine-learning model may be trained to provide a probability distribution on the predicted quality of service for a given environmental model. This may be done to avoid situations, in which a common quality of service prediction value skews the prediction.

In some disclosed embodiments, the one or more active transceivers are placed on a grid within the environmental model. The grid may comprise a plurality of adjoining cells. The one or more active transceivers may be aggregated per cell within the grid. For example, the grid may be used to facilitate the maintenance of the environmental model and limit the number of inputs of the machine-learning model.

For example, the grid may be a circular grid. Transmissions by other active transceivers influence the wireless communication link based on their distance, which may be modeled by the circular grid.

The predicted quality of service may relate to at least one of a packet inter-reception time, a packet error rate, a latency and a data rate. These are quality of service properties that can be predicted using the above-mentioned machine-learning model.

Disclosed embodiments of the present disclosure further provide a computer program having a program code for performing the above method, when the computer program is executed on a computer, a processor, or a programmable hardware component.

Disclosed embodiments of the present disclosure further provide an apparatus for predicting a future quality of service of a wireless communication link between a mobile transceiver and a further mobile transceiver. The apparatus comprises one or more interfaces for communicating in a mobile communication system. The apparatus comprises a control module configured to carry out the above method.

Various example embodiments will now be described more fully with reference to the accompanying drawings in which some example embodiments are illustrated. In the figures, the thicknesses of lines, layers or regions may be exaggerated for clarity. Optional components may be illustrated using broken, dashed or dotted lines.

Accordingly, while example embodiments are capable of various modifications and alternative forms, embodiments thereof are shown by way of example in the figures and will herein be described in detail. It should be understood, however, that there is no intent to limit example embodiments to the particular forms disclosed, but on the contrary, example embodiments are to cover all modifications, equivalents, and alternatives falling within the scope of the disclosure. Like numbers refer to like or similar elements throughout the description of the figures.

As used herein, the term, "or" refers to a non-exclusive or, unless otherwise indicated (e.g., "or else" or "or in the alternative"). Furthermore, as used herein, words used to describe a relationship between elements should be broadly construed to include a direct relationship or the presence of intervening elements unless otherwise indicated. For example, when an element is referred to as being "connected" or "coupled" to another element, the element may be directly connected or coupled to the other element or intervening elements may be present. In contrast, when an element is referred to as being "directly connected" or "directly coupled" to another element, there are no intervening elements present. Similarly, words such as "between", "adjacent", and the like should be interpreted similarly.

The terminology used herein is for the purpose of describing particular disclosed embodiments only and is not intended to be limiting of example embodiments. As used herein, the singular forms "a," "an" and "the" are intended to include the plural forms as well, unless the context clearly indicates otherwise. It will be further understood that the terms "comprises," "comprising," "includes" or "including," when used herein, specify the presence of stated features, integers, operations, elements or components, but do not preclude the presence or addition of one or more other features, integers, operations, elements, components or groups thereof.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Figure 1B:
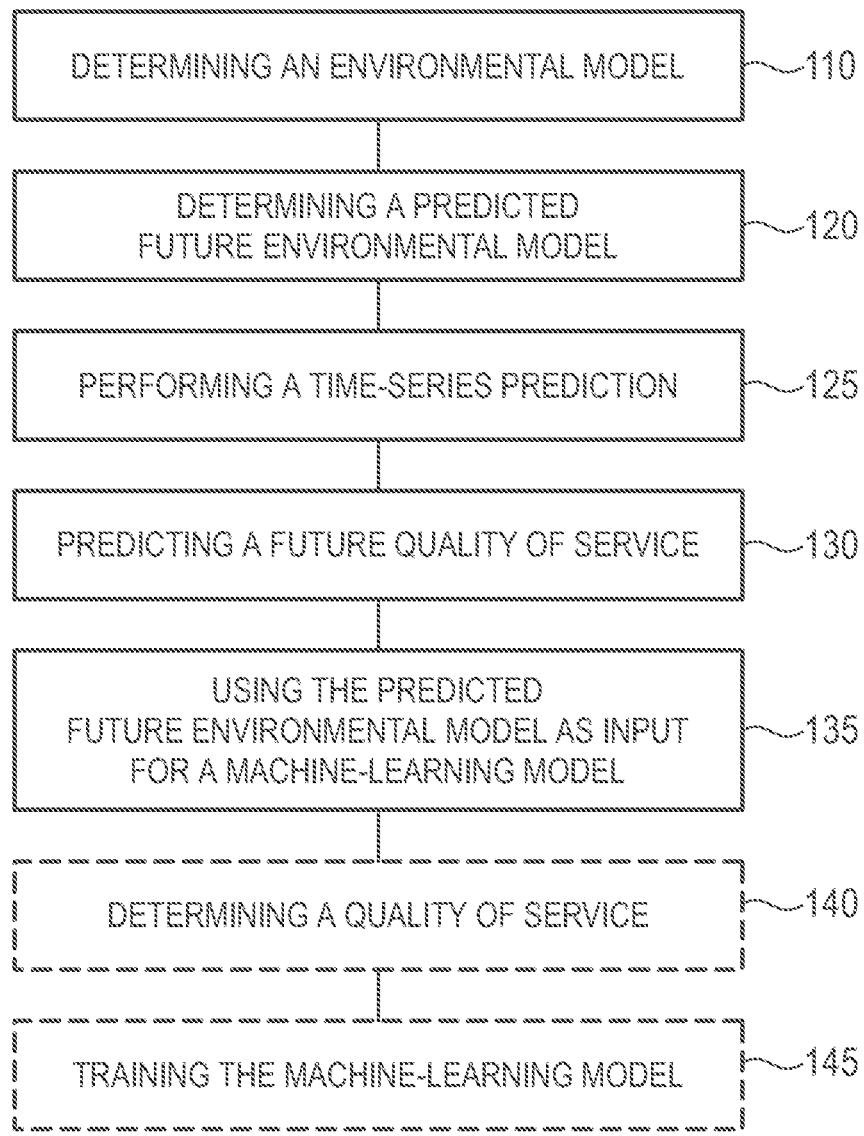
FIG. 1B shows another flow chart of an exemplary embodiment of a method for predicting a future quality of service of a wireless communication link between a mobile transceiver and a further mobile transceiver.

FIGS. 1A and 1B show flow charts of exemplary embodiments of a method for predicting a future quality of service of a wireless communication link between a mobile transceiver 100 and a further mobile transceiver 102. The method comprises determining 110 a plurality of environmental models of one or more active transceivers 104 in the environment of the mobile transceiver over a plurality of points in time. The method comprises determining 120 a predicted future environmental model of the one or more active transceivers at a point in time of the future using a time-series projection 125 on the plurality of environmental models. The method comprises predicting 130 the future quality of service of the wireless communication link for point in time of the future using a machine-learning model. The machine-learning model is trained to provide information on a predicted quality of service for a given environmental model. The predicted future environmental model is used 135 as input to the machine-learning model.

Figure 1C:
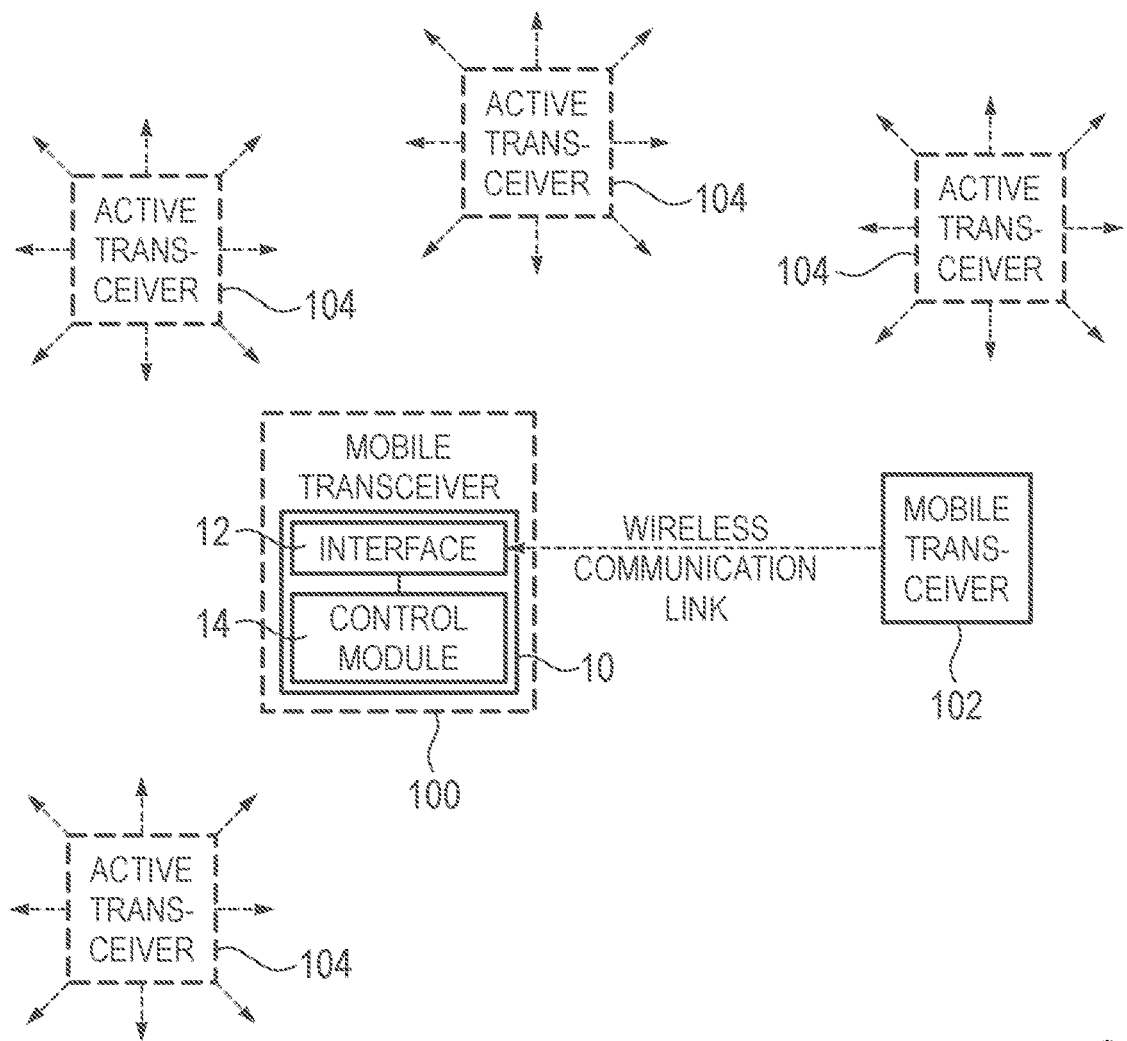
FIG. 1C shows a schematic diagram of an apparatus for predicting a future quality of service of a wireless communication link between a mobile transceiver and a further mobile transceiver, and of a mobile transceiver, such as a transportation vehicle, comprising the apparatus.

FIG. 1C shows a schematic diagram of a corresponding apparatus 10 for predicting a future quality of service of a wireless communication link between a mobile transceiver 100 and a further mobile transceiver 102, and of a mobile transceiver 100, such as a transportation vehicle, comprising the apparatus 10. The apparatus comprises one or more interfaces 12 for communicating in a mobile communication system. The apparatus comprises a control module 14 configured to carry out at least one of the methods shown in FIGS. 1A, 1B and/or 1D. In general, the control module 14 may provide the functionality of the apparatus 10, e.g., in conjunction with the one or more interfaces 12.

The following description relates both to the method of FIGS. 1A and/or 1B and to the apparatus of FIG. 1C. Features described in connection with the method of FIGS. 1A and/or 1B may likewise be applied to the apparatus of FIG. 1C.

Disclosed embodiments of the present disclosure relate to a method, apparatus and computer program for predicting a future quality of service of a wireless communication link between a mobile transceiver and a further mobile transceiver. To predict future service availability and QoS, it may be beneficial to have a sound understanding of the radio environment. Typical properties of the radio environment may be pathloss, interference conditions, the load of a system, number of frequency carriers, a number of radio access technologies (RATs), etc. The more detailed a radio environment is modelled, the higher the amount of information that is needed for its classification.

As has been laid out above, a future QoS of the wireless communication link is determined. In this context, the prefix "future" indicates, that the QoS is predicted for a point in time of the future. To achieve this, the presence (and thus the activity) of the one or more active transceivers may be predicted for the future (e.g., using the trajectory of the one or more active transceivers), and the prediction of the future QoS may be based on the prediction of the future activity of the one or more active transceivers. The QoS being predicted may comprise one or more properties, such as a predicted minimal, average and/or maximal data transmission rate on the wireless link, a minimal, average and/or maximal packet or bit error rate, a minimal, average or maximal time between two successful transmissions of packets (e.g., also denoted packet inter-reception time, PIR), a minimal, average or maximal latency etc. In other words, the predicted quality of service may relate to at least one of a packet inter-reception time, a packet error rate, a latency and a data rate of the wireless communication link. In general, the predicted QoS may indicate an expected performance and/or an expected reliability of the wireless link.

In exemplary embodiments, the future QoS of the wireless link may be predicted by the mobile transceiver, i.e., by the receiver of wireless transmissions on the wireless link. Accordingly, the method may be executed by the mobile transceiver, and/or the mobile transceiver may comprise the apparatus of FIG. 1C.

The method comprises determining 110 the plurality of environmental models of the one or more active transceivers 104 in the environment of the mobile transceiver over the plurality of points in time. In general, the environmental model of the one or more active transceivers may model the environment of the mobile transceivers with regards to a presence and/or a transmission activity of the one or more active transceivers. For example, the environmental model may comprise and/or represent the position of the one or more active transceivers within the environment of the mobile transceiver. In various disclosed embodiments, the environmental model may be limited to a pre-defined range around the mobile transceiver, e.g., a pre-defined circular distance, or according to a pre-defined size of a grid. For example, the one or more active transceivers may be placed on a grid within the environmental model. The grid may comprise a plurality of adjoining cells. The one or more active transceivers may be aggregated per cell within the grid. In other words, the position and/or distance of the one or more mobile transceivers may be represented by the cell of the grid they are placed in.

For example, in some cases, the grid may be a two-dimensional rectangular grid. In other words, the cells of the grid may have a rectangular shape. Additionally, each cell of the grid may have (substantially) the same size/dimensions. Alternatively, the grid may be a circular grid, e.g., a one-dimensional circular grid. In a one-dimensional circular grid, the cells of the grid are formed along one dimension, i.e., the distance from the center, such that a plurality of concentric circles form the grid, with the space between the circles being the cells of the grid. In a two-dimensional circular grid, each space between two adjacent circles is further sub-divided, e.g., into quadrants. In other words, the grid may be formed by circles, with the space between two circles being (in a one-dimensional circular grid) or comprising (in a two-dimensional circular grid) the cells of the grid. If a two-dimensional circular grid is used, each space between two circles may be divided, e.g., into quadrants, such that multiple cells are present in the space between two circles. Each circle of the circular grid may represent a distance. For example, active transceivers that are placed in a cell between the center point of the circular grid (i.e., where the mobile transceiver is located) and the first circle (from the center point) may have a distance of at most n meters from the mobile transceiver, active transceivers that are placed in a cell between the first circle and a second circle may have a distance of more than n meters and at most 2n meters from the active transceiver etc. Such a grid is applied in the table of FIGS. 2A-2B.

In exemplary embodiments, determining 110 the plurality of environmental models may comprise obtaining information on the one or more active transceivers. For example, the method may comprise collecting information about the position of the one or more active transceivers via wireless messages of the one or more active transceivers (e.g., wireless vehicle-to-vehicle messages, if the active transceivers are transportation vehicles). For example, periodic status messages of the one or more active transceivers may be processed to collect the information about the position of the one or more active transceivers. Accordingly, the method may comprise receiving wireless transmission of the one or more active transceivers. The mobile transceiver may receive wireless transmissions of the one or more active transceivers (e.g., other vehicles/transceivers). Based on the received wireless transmissions, the position of the one or more active transceivers may be determined. For example, the wireless transmissions may comprise information on a position of the active transceiver having transmitted the respective wireless message. The method may comprise determining the environmental model of the one or more active transceivers based on the received wireless transmissions of the one or more active transceivers. In more general terms, the method may comprise generating the environmental model based on the determined position of the one or more active transceivers.

In various disclosed embodiments, the method may comprise receiving at least a portion of at least a subset of the plurality of environmental models from another mobile transceiver, e.g., from a mobile transceiver of the one or more active transceivers. For example, after determining their environmental model, the mobile transceivers may share the information with other mobile transceivers, e.g., by broadcasting the respective environmental model. In other words, the method may comprise broadcasting the environmental model to other mobile transceivers.

Based on the information collectively collected by the mobile transceivers, each mobile transceiver/vehicle may perform a prediction of the future QoS of wireless links it maintains with other mobile transceivers.

In exemplary embodiments, a plurality of environmental models of the one or more active transceivers are determined over a plurality of points in time. Each of the plurality of environmental models may represent the one or more active transceivers in the environment of the mobile transceiver at a point in time of the plurality of points in time. The plurality of environmental models may be generated over time, e.g., periodically. FIGS. 2A-2B show an example of a plurality of environmental models being generated over a plurality of points in time, e.g., every 0.5 seconds. In the context of this disclosure, the term "at or for a point or points in time (of the future)" merely indicates, that an action is performed that pertains to the point or points in time, and not necessarily that the action is performed precisely at the same point or points in time of the future. In some cases, however, the respective actions may be performed at the same point in time, e.g., in cases where the quality of service is determined (and not predicted) at a specific point in time.

The method comprises determining 120 the predicted future environmental model of the one or more active transceivers at a point in time of the future using a time-series projection 125 on the plurality of environmental models. In general, a time-series projection predicts a development of one or more numerical values over a time interval (comprising a plurality of points in time), based on historic data on the one or more numerical values. In other words, a trend of the one or more numerical values may be predicted based on the historic data on the numerical values, and a time-series on the development of the development of the numerical values may be predicted. In exemplary embodiments, the one or more numerical values may represent (i.e., form) the environmental model. For example, each environmental model may be represented with a plurality of numerical values. For example, each environmental may comprise numerical information on a number of active transceivers per cell of the grid, with the number of active transceivers per cell of the grid being the values that the time-series projection is performed on. Accordingly, the plurality of environmental models of the one or more active transceivers in the environment of the mobile transceivers may be historical data on the one or more numerical values (representing the predicted future environmental model).

There are different approaches to performing a time-series projection. In some disclosed embodiments, a statistics-based approach may be used. For example, the time-series projection may be performed 125 based on a statistical fitting function or based on a time autocorrelation function. In a statistical fitting function, a trend of a numerical value may be predicted by performing fitting on historical data on the numerical value. Time autocorrelation is an autocorrelation function that is performed on a time series, to predict a development of the time series over a point or period of time of the future. Both functions may be applied to the above objective. For example, the statistical fitting function or the time autocorrelation function may applied in the plurality of environmental models, to determine the predicted future environmental model (at the point of time of the future, or at least two points in time of the future).

Alternatively, machine-learning may be used to perform the time-series projection. In other words, the time-series projection 125 is performed using a further machine-learning model. In general, as will also be introduced later, the prediction of numerical values via a machine-learning model may be performed using a regression-based machine-learning algorithm. To train the further machine-learning model, the plurality of environmental models (as represented by the numerical values) may be divided into training input, training output, and unused environmental models. For example, if the future environmental model is to be predicted for a point in time that is a pre-defined time interval away, for each training sample, a subset of the plurality of environmental models may be selected as training input for the training of the further machine-learning model and an environmental model that is determined for a time that is the pre-defined time interval away (in the future) from the subset of environmental models may be used as a training output. The sub-division may be repeated in a way that resembles a sliding-window over the plurality of environmental models. Based on the training, the further machine-learning model may be configured to generate a predicted future environmental model for a point in time in the future that is the pre-defined time interval being input into the further machine-learning model. Again, the further machine-learning model may be used on subsets of the plurality of environmental model in a way that resembles a sliding window to determine the predicted future environmental model (or rather at least two/a plurality of predicted future environmental models) for at least two/a plurality of points in time of the future. The same concept may be applied to the statistics-based functions.

Both approaches attempt to predict the development of the environmental model into the future (i.e., up to the point in time of the future), to enable a subsequent usage of the predicted future environmental model for the prediction of the future quality of service. In other words, the time-series projection may be determined 125 such, that a progression of the environmental models towards the predicted future environmental model is predicted. In any case, the prediction of the future environmental model may attempt to model the movement of the one or more active transceivers and the corresponding movement of the mobile transceiver (and of the further mobile transceiver).

Contrary to intuition, the time-series projection might not be applied directly to the prediction of the future quality of service (since that might be less reliable without some additional inputs), but instead to the environmental model underlying the prediction of the future quality of service. In other words, the time-series projection may yield the predicted future environmental model, with the future quality of service being predicted based on the predicted future environmental model.

The method comprises predicting 130 the future quality of service of the wireless communication link for the point in time of the future using a machine-learning model. The predicted future environmental model is used 135 as input to the machine-learning model. The output of the machine-learning model may be the future quality of service of the wireless communication link, or the future quality of service of the wireless communication link may be predicted based on the output of the machine-learning model.

Machine learning refers to algorithms and statistical models that computer systems may use to perform a specific task without using explicit instructions, instead relying on models and inference. For example, in machine-learning, instead of a rule-based transformation of data, a transformation of data may be used, that is inferred from an analysis of historical and/or training data. For example, the content of images may be analyzed using a machine-learning model or using a machine-learning algorithm. For the machine-learning model to analyze the content of an image, the machine-learning model may be trained using training images as input and training content information as output. By training the machine-learning model with a large number of training images and associated training content information, the machine-learning model "learns" to recognize the content of the images, so the content of images that are not included of the training images can be recognized using the machine-learning model. The same principle may be used for other kinds of sensor data as well: By training a machine-learning model using training sensor data and a desired output, the machine-learning model "learns" a transformation between the sensor data and the output, which can be used to provide an output based on non-training sensor data provided to the machine-learning model. In exemplary embodiments, the machine-learning model is trained to provide a transformation between an environmental model and a predicted quality of service of the wireless communication link in light of the environmental model. In other words, the machine-learning model is trained to correlate the environmental model with the predicted quality of service of the wireless communication link.

Machine-learning models are trained using training input data. The examples specified above use a training method called "supervised learning". In supervised learning, the machine-learning model is trained using a plurality of training samples, wherein each sample may comprise a plurality of input data values, and a plurality of desired output values, i.e., each training sample is associated with a desired output value. By specifying both training samples and desired output values, the machine-learning model "learns" which output value to provide based on an input sample that is similar to the samples provided during the training. Supervised learning may be based on a supervised learning algorithm, e.g., a classification algorithm, a regression algorithm or a similarity learning algorithm. Classification algorithms may be used when the outputs are restricted to a limited set of values, i.e., the input is classified to one of the limited set of values. Regression algorithms may be used when the outputs may have any numerical value (within a range). Similarity learning algorithms are similar to both classification and regression algorithms, but are based on learning from examples using a similarity function that measures how similar or related two objects are.

In general, the machine-learning model is trained to provide information on a predicted quality of service for a given environmental model. For example, the predicted quality of service of the wireless communication link may be represented by a numerical value, which is obtainable using a regression-based machine-learning algorithm. For example, the predicted quality of service may relate to at least one of a packet inter-reception time, a packet error rate, a latency and a data rate, which may all be represented by numerical values. Accordingly, the machine-learning model may trained to implement (i.e., be based on) a regression algorithm, e.g., to predict at least one of a packet inter-reception time, a packet error rate, a latency and a data rate of the wireless communication link.

Figure 1D:
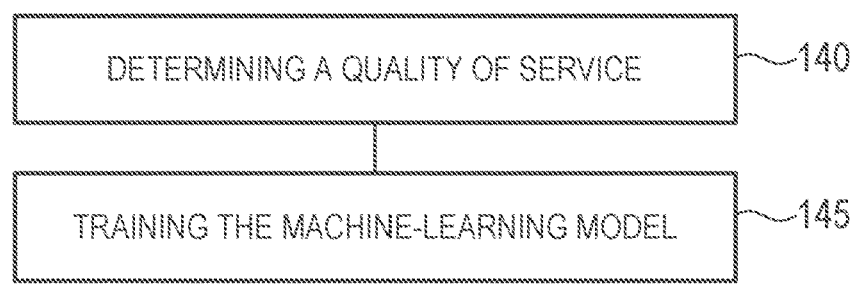
FIG. 1D shows a flow chart of an exemplary embodiment of a method for training a machine-learning model.

In some disclosed embodiments, the machine-learning model is trained specifically for the mobile transceiver. Alternatively, the machine-learning model may be a generic machine-learning model that is applicable to different mobile transceivers. In either case, the method may comprise training the machine-learning model, or the machine-learning model may be trained by another entity (for which another method may be used, as shown in FIG. 1D).

In general, the machine-learning model may be trained to correlate the (predicted) quality of service with the environmental model of the one or more active transceivers in the environment of the mobile transceivers. Accordingly, environmental models and the corresponding quality of service may be used to train the machine-learning model. In general, a plurality of training samples are used to train a machine-learning model. In exemplary embodiments, a plurality of environmental models of the one or more active transceivers are determined over the plurality of points in time. Correspondingly, the method may comprise determining 140 a quality of service of the wireless communication link at the plurality of points in time. In other words, for the plurality of points in time, the quality of service may be determined (in light of the one or more active transceivers in the environment of the mobile transceiver). For example, the quality of service may be determined by determining metrics of the wireless communication link, such as a packet inter-reception time, a packet error rate, a latency and/or a data rate of the wireless communication link. The method may comprise training 145 the machine-learning model using the plurality of environmental models at the plurality of points of time as training input and the quality of service of the wireless communication link at the corresponding plurality of points in time as training output of the training of the machine-learning model. In other words, the environmental models of the plurality of environmental may be used, together with the corresponding quality of service, as training samples for the training of the machine-learning model.

In some disclosed embodiments, the output of the machine-learning model may be something other than the "raw" values of the various quality of service properties. For example, some important properties, such as the packet inter reception time (PIR time) of a wireless link often are at their minimal value (i.e., the transmission time), because the respective transmission is successful the first time. Training a machine-learning model in such scenarios may yield machine-learning models that are skewed towards this minimal value. This may be avoided by training the machine-learning model to output a proxy value, which can be used to determine the actual quality of service property. One such proxy is the probability distribution which models, how high the probability for a given value of a quality of service property (such as packet inter-reception time, packet error rate, latency and data rate) is for a given environmental model. In other words, the machine-learning model may be trained to provide a probability distribution on the predicted quality of service for a given environmental model. For example, as shown in connection with FIGS. 3A-3D, some properties of the quality of service, such as the packet inter reception time (PIR time) can be modeled using an exponential distribution of the probabilities. Such an exponential distribution can be modeled using the following formula, with γ being the quality of service property and λ being the rate.

$$f_\lambda(\gamma) = \begin{cases} \lambda e^{-\lambda \gamma} & \text{for } \gamma \geq 0 \\ 0 & \text{for } \gamma < 0 \end{cases}$$

The rate can be modeled as a function λ(x) of the environmental model (i.e., the distribution of the one or more active transceivers in the environment of the mobile transceiver) and the distance between the transmitter and receiver (Inter Antenna Distance, IAD).

$$f_{\lambda(x)}(\gamma) = \begin{cases} \lambda(x) e^{-\lambda(x) \cdot \gamma} & \text{for } \gamma \geq 0 \\ 0 & \text{for } \gamma < 0 \end{cases}$$

The rate is indicative of the (exponential) probability distribution of the property (e.g., PIR time) of the quality of service. Accordingly, the machine-learning model may be trained to provide the (predicted) rate, and thus the probability distribution, for the (predicted) quality of service for a given environmental model. The method may comprise determining the predicted future quality of service of the wireless link based on the rate/probability distribution provided by the machine-learning model. Further details can be found in the examples provided in connection with FIGS. 3A-3D, where a suitable machine-learning model is trained based on simulated data.

Subsequently, the rate may be used to determine the predicted future quality of service. The predicted future quality of service value may be obtained using 1/λ for the exponential distribution. The quantiles of the predicted future quality of service value may be obtained using the quantile function, also called inverse cumulative distribution function, of the exponential distribution:

$$F^{-1}(p,\lambda) = -\frac{\ln(1-p)}{\lambda}$$

For example, the 3rd quartile is obtained using p=0.75 and the 9th quantile with p=0.9.

In various exemplary embodiments, the future quality of service is predicted for a plurality of points in time of the future (i.e., at least two points in time of the future). For example, the method may comprise predicting a development of the future quality of service over the plurality of points in time of the future. Disclosed embodiments of the present disclosure may be scaled over the plurality of points in time of the future by determining the predicted future environmental model (or rather a plurality of predicted future environmental models) at the plurality of points in time of the future, and using the predicted future environmental models as input to the machine-learning model. In other words, the future quality of service of the wireless communication link may be predicted for the at least two points in time of the future by determining 120 the predicted future environmental model of the one or more active transceivers at the at least two points in time of the future, and using 135 the predicted future environmental model of the one or more active transceivers at the at least two points in time of the future as inputs for the machine-learning model.

In the following, another method is shown, that may be used to train the machine-learning model separately from the method presented above. FIG. 1D shows a flow chart of an exemplary embodiment of a method for training a machine-learning model. The method of FIG. 1D comprises determining 140 a quality of service of the wireless communication link at the plurality of points in time, and training 145 the machine-learning model using the plurality of environmental models at the plurality of points of time as training input and the quality of service of the wireless communication link at the corresponding plurality of points in time as training output of the training of the machine-learning model.

Machine-learning algorithms are usually based on a machine-learning model. In other words, the term "machine-learning algorithm" may denote a set of instructions that may be used to create, train or use a machine-learning model. The term "machine-learning model" may denote a data structure and/or set of rules that represents the learned knowledge, e.g., based on the training performed by the machine-learning algorithm. In disclosed embodiments, the usage of a machine-learning algorithm may imply the usage of an underlying machine-learning model (or of a plurality of underlying machine-learning models). The usage of a machine-learning model may imply that the machine-learning model and/or the data structure/set of rules that is the machine-learning model is trained by a machine-learning algorithm.

For example, the machine-learning model may be an artificial neural network (ANN). ANNs are systems that are inspired by biological neural networks, such as can be found in a brain. ANNs comprise a plurality of interconnected nodes and a plurality of connections, so-called edges, between the nodes. There are usually three types of nodes, input nodes that receiving input values, hidden nodes that are (only) connected to other nodes, and output nodes that provide output values. Each node may represent an artificial neuron. Each edge may transmit information, from one node to another. The output of a node may be defined as a (non-linear) function of the sum of its inputs. The inputs of a node may be used in the function based on a "weight" of the edge or of the node that provides the input. The weight of nodes and/or of edges may be adjusted in the learning process. In other words, the training of an artificial neural network may comprise adjusting the weights of the nodes and/or edges of the artificial neural network, i.e., to achieve a desired output for a given input. In at least some exemplary embodiments, the machine-learning model may be deep neural network, e.g., a neural network comprising one or more layers of hidden nodes (i.e., hidden layers), optionally a plurality of layers of hidden nodes.

Figure 3A:
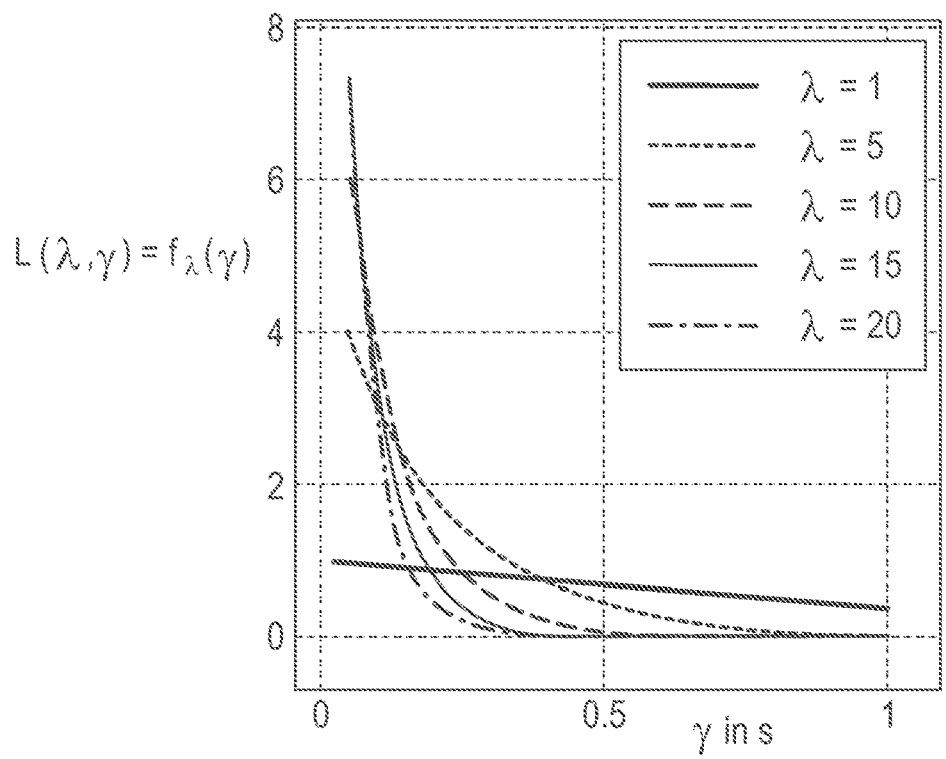
FIG. 3A shows a first schematic diagram related to a training of a machine-learning model.
Figure 3B:
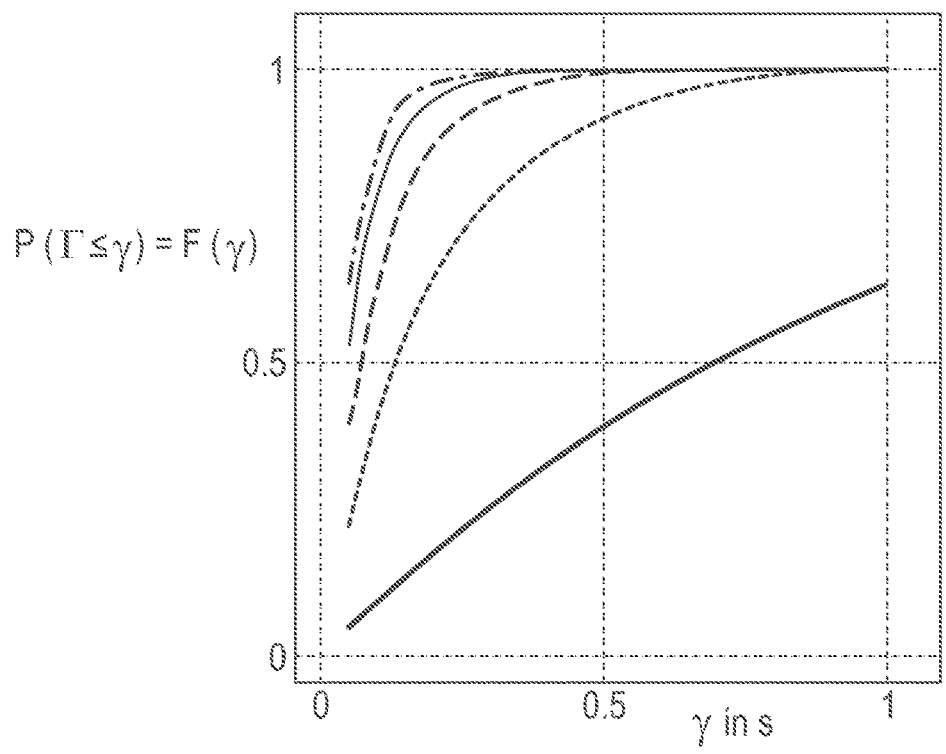
FIG. 3B shows a second schematic diagram related to a training of a machine-learning model.
Figure 3C:
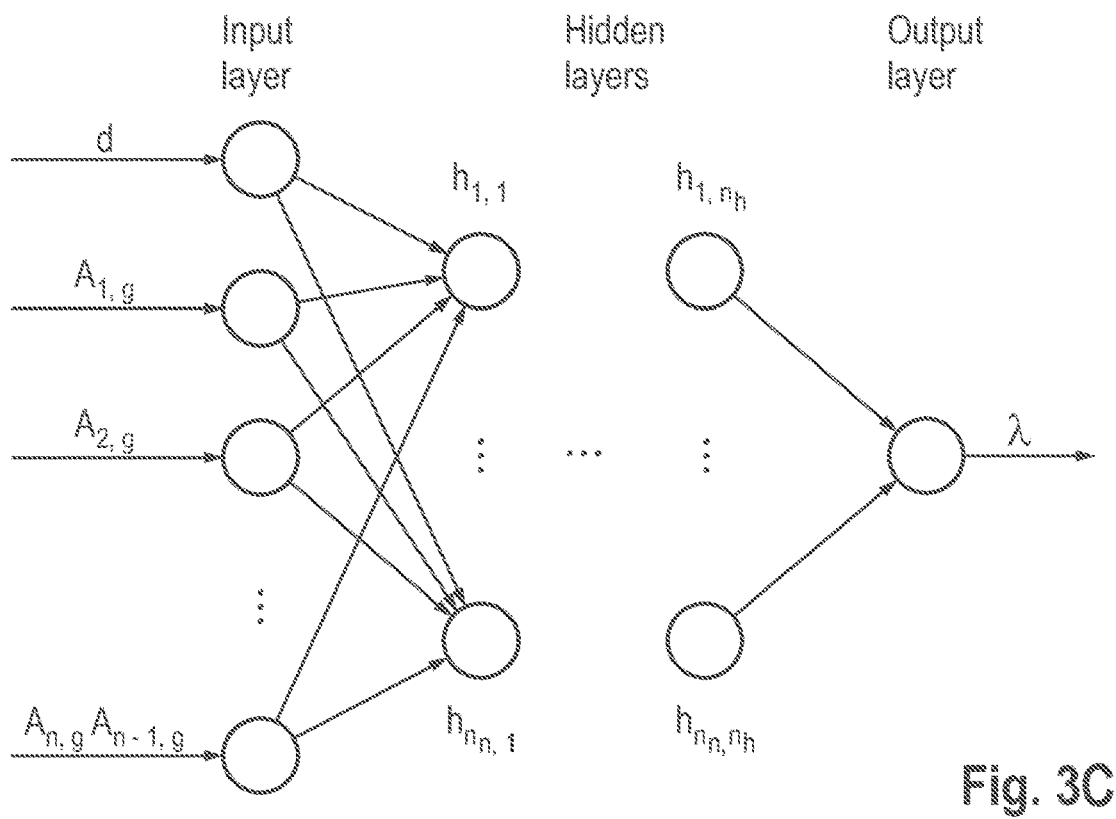
FIG. 3C shows a third schematic diagram related to a training of a machine-learning model.

FIG. 3C shows a schematic diagram of an exemplary architecture for the machine-learning model. The machine-learning model comprises an input layer with input nodes for the distance d between the mobile transceiver and the further mobile transceiver, and for the number of active transceivers in the cells of the circular grids of width g, represented by $A_{1,g} \ldots A_{n,g}$, with n being the number of cells of the circular grid being considered. The architecture further comprises $n_h$ hidden layers, each with $n_n$ nodes ($h_{1,1} \ldots h_{n_n,n_h}$). The architecture further comprises an output layer, which outputs the rate λ, and thus the probability distribution of the quality of service.

In some exemplary embodiments, the machine-learning model may be a support vector machine. Support vector machines (i.e., support vector networks) are supervised learning models with associated learning algorithms that may be used to analyze data, e.g., in classification or regression analysis. Support vector machines may be trained by providing an input with a plurality of training input values that belong to one of two categories. The support vector machine may be trained to assign a new input value to one of the two categories. Alternatively, the machine-learning model may be a Bayesian network, which is a probabilistic directed acyclic graphical model. A Bayesian network may represent a set of random variables and their conditional dependencies using a directed acyclic graph. Alternatively, the machine-learning model may be based on a genetic algorithm, which is a search algorithm and heuristic technique that mimics the process of natural selection.

The apparatus 10 and the mobile transceiver 100; 102; 104 (e.g., the transportation vehicles or entities) may communicate through a mobile communication system. The mobile communication system may, for example, correspond to one of the Third Generation Partnership Project (3GPP)-standardized mobile communication networks, where the term mobile communication system is used synonymously to mobile communication network. The messages (input data, measured data, control information) may hence be communicated through multiple network nodes (e.g., internet, router, switches, etc.) and the mobile communication system, which generates delay or latencies considered in disclosed embodiments.

The mobile or wireless communication system may correspond to a mobile communication system of the 5th Generation (5G, or New Radio) and may use mm-Wave technology. The mobile communication system may correspond to or comprise, for example, a Long-Term Evolution (LTE), an LTE-Advanced (LTE-A), High Speed Packet Access (HSPA), a Universal Mobile Telecommunication System (UMTS) or a UMTS Terrestrial Radio Access Network (UTRAN), an evolved-UTRAN (e-UTRAN), a Global System for Mobile communication (GSM) or Enhanced Data rates for GSM Evolution (EDGE) network, a GSM/EDGE Radio Access Network (GERAN), or mobile communication networks with different standards, for example, a Worldwide Inter-operability for Microwave Access (WIMAX) network IEEE 802.16 or Wireless Local Area Network (WLAN) IEEE 802.11, generally an Orthogonal Frequency Division Multiple Access (OFDMA) network, a Time Division Multiple Access (TDMA) network, a Code Division Multiple Access (CDMA) network, a Wideband-CDMA (WCDMA) network, a Frequency Division Multiple Access (FDMA) network, a Spatial Division Multiple Access (SDMA) network, etc.

Service provision may be carried out by a network component, such as a base station transceiver, a relay station or a UE, e.g., coordinating service provision in a cluster or group of multiple UEs/vehicles. A base station transceiver can be operable or configured to communicate with one or more active mobile transceivers/vehicles and a base station transceiver can be located in or adjacent to a coverage area of another base station transceiver, e.g., a macro cell base station transceiver or small cell base station transceiver. Hence, exemplary embodiments may provide a mobile communication system comprising two or more mobile transceivers/vehicles 100; 102 and one or more base station transceivers, wherein the base station transceivers may establish macro cells or small cells, as, e.g., pico-, metro-, or femto cells. A mobile transceiver or UE may correspond to a smartphone, a cell phone, a laptop, a notebook, a personal computer, a Personal Digital Assistant (PDA), a Universal Serial Bus (USB)-stick, a car, a vehicle, a road participant, a traffic entity, traffic infrastructure etc. A mobile transceiver may also be referred to as User Equipment (UE) or mobile in line with the 3GPP terminology. For example, the mobile transceiver, the further mobile transceivers and/or at least a subset of the one or more active transceivers may be transportation vehicles, e.g., a land vehicle, a road vehicle, a car, an automobile, an off-road vehicle, a truck or a lorry.

A base station transceiver can be located in the fixed or stationary part of the network or system. A base station transceiver may be or correspond to a remote radio head, a transmission point, an access point, a macro cell, a small cell, a micro cell, a femto cell, a metro cell etc. A base station transceiver can be a wireless interface of a wired network, which enables transmission of radio signals to a UE or mobile transceiver. Such a radio signal may comply with radio signals as, for example, standardized by 3GPP or, generally, in line with one or more of the above listed systems. Thus, a base station transceiver may correspond to a NodeB, an eNodeB, a gNodeB, a Base Transceiver Station (BTS), an access point, a remote radio head, a relay station, a transmission point, etc., which may be further subdivided in a remote unit and a central unit.

A mobile transceiver or transportation vehicle 100 can be associated with a base station transceiver or cell. The term cell refers to a coverage area of radio services provided by a base station transceiver, e.g., a NodeB (NB), an eNodeB (eNB), a gNodeB, a remote radio head, a transmission point, etc. A base station transceiver may operate one or more cells on one or more frequency layers, in some disclosed embodiments a cell may correspond to a sector. For example, sectors can be achieved using sector antennas, which provide a characteristic for covering an angular section around a remote unit or base station transceiver. In some disclosed embodiments, a base station transceiver may, for example, operate three or six cells covering sectors of 120° (in case of three cells), 60° (in case of six cells) respectively. A base station transceiver may operate multiple sectorized antennas. In the following a cell may represent an according base station transceiver generating the cell or, likewise, a base station transceiver may represent a cell the base station transceiver generates.

The apparatus 10 may be comprised in a server, a base station, a NodeB, a UE, a mobile transceiver, a relay station, or any service coordinating network entity in exemplary embodiments. It is to be noted that the term network component may comprise multiple sub-components, such as a base station, a server, etc.

In exemplary embodiments the one or more interfaces 12 may correspond to any method or mechanism for obtaining, receiving, transmitting or providing analog or digital signals or information, e.g., any connector, contact, pin, register, input port, output port, conductor, lane, etc. which allows providing or obtaining a signal or information. An interface may be wireless or wireline and it may be configured to communicate, i.e., transmit or receive signals, information with further internal or external components. The one or more interfaces 12 may comprise further components to enable according communication in the mobile communication system, such components may include transceiver (transmitter and/or receiver) components, such as one or more Low-Noise Amplifiers (LNAs), one or more Power-Amplifiers (PAs), one or more duplexers, one or more diplexers, one or more filters or filter circuitry, one or more converters, one or more mixers, accordingly adapted radio frequency components, etc. The one or more interfaces 12 may be coupled to one or more antennas, which may correspond to any transmit and/or receive antennas, such as horn antennas, dipole antennas, patch antennas, sector antennas etc. The antennas may be arranged in a defined geometrical setting, such as a uniform array, a linear array, a circular array, a triangular array, a uniform field antenna, a field array, combinations thereof, etc. In some examples the one or more interfaces 12 may serve the purpose of transmitting or receiving or both, transmitting and receiving, information, such as information, input data, control information, further information messages, etc.

As shown in FIG. 1C the respective one or more interfaces 12 is coupled to the respective control module 14 at the apparatus 10. In exemplary embodiments the control module 14 may be implemented using one or more processing units, one or more processing devices, any method or mechanism for processing, such as a processor, a computer or a programmable hardware component being operable with accordingly adapted software. In other words, the described functions of the control module 14 may as well be implemented in software, which is then executed on one or more programmable hardware components. Such hardware components may comprise a general-purpose processor, a Digital Signal Processor (DSP), a micro-controller, etc.

In disclosed embodiments, communication, i.e., transmission, reception or both, may take place among mobile transceivers/vehicles 100; 102 directly, e.g., forwarding input data or control information to/from a control center. Such communication may make use of a mobile communication system. Such communication may be carried out directly, e.g., by Device-to-Device (D2D) communication. Such communication may be carried out using the specifications of a mobile communication system. An example of D2D is direct communication between transportation vehicles, also referred to as Vehicle-to-Vehicle communication (V2V), car-to-car, Dedicated Short Range Communication (DSRC), respectively. Technologies enabling such D2D-communication include 802.11p, 3GPP systems (4G, 5G, NR and beyond), etc.

In disclosed embodiments, the one or more interfaces 12 can be configured to wirelessly communicate in the mobile communication system. To do so radio resources are used, e.g., frequency, time, code, and/or spatial resources, which may be used for wireless communication with a base station transceiver as well as for direct communication. The assignment of the radio resources may be controlled by a base station transceiver, i.e., the determination which resources are used for D2D and which are not. Here and in the following radio resources of the respective components may correspond to any radio resources conceivable on radio carriers and they may use the same or different granularities on the respective carriers. The radio resources may correspond to a Resource Block (RB as in LTE/LTE-A/LTE-unlicensed (LTE-U)), one or more carriers, sub-carriers, one or more radio frames, radio sub-frames, radio slots, one or more code sequences potentially with a respective spreading factor, one or more spatial resources, such as spatial sub-channels, spatial precoding vectors, any combination thereof, etc. For example, in direct Cellular Vehicle-to-Anything (C-V2X), where V2X includes at least V2V, V2-Infrastructure (V2I), etc., transmission according to 3GPP Release 14 onward can be managed by infrastructure (so-called mode 3) or run in a UE.

More details and facets of the method, apparatus or mobile transceiver are mentioned in connection with the proposed concept or one or more examples described above or below (e.g., FIGS. 2A-3D). The method, apparatus or mobile transceiver may comprise one or more additional optional features corresponding to one or more facets of the proposed concept or one or more examples described above or below.

Various exemplary embodiments relate to a method for increasing the prediction horizon in QoS prediction using time-series projection. In the scope of cooperative driving, the prediction of the future quality of service (QoS) enables the vehicular application when the QoS conditions vary. Indeed, when no predictive QoS (PQoS) is provided, the application can only react to variations and is therefore limited to lower bound performances of the communication system. PQoS systems can run on the transportation vehicles, the communication nodes, with radio access technologies (RATs) such as LTE-V or 5G-V2X in their standalone modes, or IEEE 802.11p. Combinations of these technologies can also be applied in multi-RAT systems. In such PQoS systems, transportation vehicles can exchange information about the communication surrounding environment to provide PQoS. Disclosed embodiments may thus relate to approaches for predicting the QoS in the future.

In other approaches, e.g., such as the paper "Prediction of Packet Inter Reception Time for Platooning using Conditional Exponential Distribution" by Jornod, El Assad, Kwoczek and Kürner, a statistical link between surrounding density and packet inter-reception time is provided. In the approach shown in the paper, however, the prediction is only instantaneous, while disclosed embodiments are aimed to predict the quality of service in the future. To be more specific, in a statistical sense, a prediction relates to a modelling of instantaneous data, and a forecast prediction of future values. According to this definition, forecasting is performed using the time-series projection, and the result of the forecasting is used to predict the future quality of service.

Disclosed embodiments may provide an approach for forecasting QoS using historical data and time-series projection in the future.

The approach comprises one or more of the following features:

1. Collecting transmission data (i.e., the wireless transmissions) from a receiver (i.e., the mobile transceiver) along with the position of surrounding communicating nodes (i.e., the one or more active transceivers).
2. Calculating the QoS indicator of interest from this receiver (i.e., the quality of service)

3. Modelling the surrounding communication environment (e.g., by generating the environmental model), e.g., to obtain the indicators of the surrounding communication environment.
4. Matching the calculated QoS indicator of the transmission data with the surrounding communication environment model with respect to time and position of the transmitter and receiver (e.g., linking the quality of service with the corresponding environmental model), e.g., enabling the estimation of the correlation between the indicators of the surrounding environment and the QoS.
5. Training a distribution model (e.g., the machine-learning model) on the collected data (see table)
6. Performing time-series projection in the future to forecast the future QoS at a prediction horizon (e.g., determine the predicted future environmental model using time-series projection), e.g., to be able to predict the QoS depending on the variation of the correlation between the indicators of the surrounding environment and the QoS
7. Varying the prediction horizon to obtain a dynamic link QoS map along time/direction (e.g., determine the predicted future environmental model at least two points in time of the future), e.g., to be able to create a QoS map that enable decision making in terms of adapting the application settings.
8. Repeating the previous feature or features with accumulated data to improve the learning (e.g., to reinforce the learning)

The communicating environment data collection may be performed either by using the radio receptor as sensor or by sharing this information with communication. The modelling of surrounding communication environment can be performed using a grid-like abstraction method for the radio activity. For example, the surrounding communication environment may be modeled using a grid like division of the environment and assigning radio activity numerical levels depending on the number of communicating transportation vehicles and the periodicity of their messages. For example, the time-series projection in the future may be performed to forecast the future QoS at a prediction horizon by using the variation of the correlation between the previous environmental predictor values and the previous QoS values. The time-series projection can be performed by using a sample of from $t_0-t_p$ to $t_0$ in the past to model (FIGS. 2A-2B 210) the distribution of the QoS at $t_0+t_f$ (FIGS. 2A-2B 230) (where $t_0$ is the current time (FIGS. 2A-2B 220), $t_p$ is the look-back time, e.g., 10 s, and $t_f$ is the prediction horizon). The variation of the prediction horizon may lead to a multiple link QoS map, one for each future timestep. It is dynamic in the sense that it may vary along time/displacement. The QoS indicator that is calculated and forecast can be the packet error rate (PER), the packet inter-reception (PIR) time, latency, data rate. For example, the time-series forecasting can use statistical prediction method such as a multiple-layer perceptron (e.g., shown in FIG. 3C).

FIGS. 2A-2B provide an example of data used for the training of a prediction model, e.g., according to one of the examples provided in connection with FIGS. 3A-3D. FIGS. 2A-2B show a table of a development of a quality of service property in relation to an environmental model over time. The table comprises various columns, the first column showing the timestamp (time), the second and third column showing the identification of the destination and source node (dst and src), the fourth column showing the size of the packet (size), the fifth column showing the PIR value (pir), the sixth column showing the distance between the transmitter and the receiver (dist, which remains fairly constant), and the seventh and following columns showing the number of nodes d* in the geographical zones (i.e., cells of the circular grid, or annuli) that are surrounding the receiver (src), with * denoting the maximal distance (e.g., d30=0 up to 30 meters, d60=more than 30, up to 60 etc.). Rectangle 210 defines the look back data, rectangle 220 defines the current timestep (defining the pre-defined time interval to the prediction horizon), and rectangle 230 defines the target prediction horizon, e.g., 8 seconds. This "sliding window" may be applied on all timesteps to train a prediction model, which would effectively be a forecasting model as we are looking at future data.

In various exemplary embodiments, the method comprises monitoring indicators of the surrounding communication environment (such as the number of surrounding communicating transportation vehicles in grid cells) and correlating the variation with the variation of the QoS. For example, the method may comprise predicting the QoS depending on the correlation of the variation of indicators of surrounding communicating transportation vehicles and the variation of the QoS (suitable for V2V communications). The method may comprise using information about the surrounding communication environment for a V2V link. The method may comprise creating a QoS map. The method may comprise performing a matching between communication environment indicators and QoS variation. The method may comprise the prediction of a QoS future value using the past variation of the correlation between environmental predictors and the QoS. Disclosed embodiments may use the aggregated communication activity at a higher layer (message level), where we want to predict the impact of hidden nodes and channel overload due to surrounding communicating transportation vehicles.

FIGS. 3A-3D show schematic diagrams related to a training of a machine-learning model. In the following, two similar approaches are introduced, which relate to a training of a machine-learning model that is suitable for providing a probability distribution on the predicted quality of service for a given environmental model. While the machine-learning models are trained using simulated environmental models, the same principle can be applied to data gathered in "real" mobile transceivers/vehicles.

In the following, the background of the two approaches is introduced. One interesting application of AQoSA (Adaptive Quality of Service Adaptation) is high-density platooning (HDPL): It is a cooperative vehicular application in which transportation vehicles coordinate their control to target small inter-vehicle distance (IVD)—below 15 m. In the scope of AQoSA, there is a need for a predictive system able to forecast the future QoS. This predictive system can make use of its surrounding environment knowledge to function. The following scenario features a five-truck HDPL driving at a speed of 25 m/s on an elliptic multi-lane test track. This platoon targets IVDs between 5 and 25 m. It is coordinated through the broadcast of platooning control message (PCM), a 700 B message transmitted at a 20 Hz rate with the IEEE 802.11p radio access technology (RAT). To challenge the communications system, vehicular traffic is introduced with increasing density on the opposite direction lanes. This surrounding traffic reaches numbers of transportation vehicles over 200 in a 400 m range around the transmitters. The surrounding transportation vehicles are broadcasting 400 B CAMs (Cooperative Awareness Messages) at a 10 Hz rate on the same RAT. The mobility of the surrounding traffic is modeled in Simulation of Urban MObility (SUMO), a simulation tool, leveraging its capability to spawn random transportation vehicles with specific densities. This traffic simulator is combined with a network simulator, ns-3, which operates the wireless transmissions with its IEEE 802.11p model. This setup allows to simulate realistic vehicular motion along with a rather precise communications system model. Using the tracing capabilities of ns-3, a total of 106 transmission observations were gathered. These observations are comprising the observed PIR time and the environment predictors described in the following. The PIR time, denoted as $\gamma$, is defined as the duration between two consecutive messages within a pair of communication partners, measured from the receiver. The PIR value is the result of consecutive transmission failures, which yields the low representation of high PIR values. These higher values are however of high interest for the application, as they may limit the performance of the application. Directly predicting $\gamma$ would most likely result in a systematic prediction of the PCM transmission period 0.05 s, as it is the minimum PIR and the most represented value. Instead, the PIR probability distribution may be modeled. The first set of features is the IAD d, that is the distance between the transmitter and the receiver, calculated between their antennas. The second set comprises or is composed of the number of communicating transportation vehicles within annuli around the transmitter $D_{n,g}=\text{card}(a_{n,g})$. The annuli $a_{n,g}$ are defined by their radius difference, $g \in \mathbb{R}^+$, and their index $n \in \mathbb{N}^+$. A further description of these features is given in G. Jornod, A. El Assaad, A. Kwoczek, and T. Kürner, "Packet inter-reception time modeling for high-density platooning in varying surrounding traffic density," in 28th IEEE Eur. Conf. Net. Commun. IEEE, 2019. In a simulation, a representation of the relationship between PIR, and the total number of transportation vehicles within a 400 m radius and the IAD was computed. In this scenario, PIR drastically increases when the number of surrounding communicating transportation vehicles is above 150. The total number also has an influence on the target; this influence drastically decreases when the IAD becomes larger than 100 m.

In the following, the prediction model is presented (which may implement the machine-learning model introduced in connection with FIGS. 1A-1D), based on the learning of the nonlinear function providing the parameter of an exponential distribution.

The distribution of the PIR may be seen as a conditional exponential distribution. In literature, PIR is shown to be well modeled by exponential, lognormal, Weibull, gamma distributions, with a preference for the last two that pass the 90% significance test. Thus, in the following, PIR may be modeled with an exponential distribution. It may be seen as a special case of the gamma distribution with the benefit of having a single parameter, the rate $\lambda > 0$. Its probability density function (PDF) is expressed as:

$$f_\lambda(\gamma) = \begin{cases} \lambda e^{-\lambda \gamma} & \text{for } \gamma \geq 0 \\ 0 & \text{for } \gamma < 0 \end{cases}$$

and illustrated for several rates $\lambda$ of interest in FIG. 3A, along with its cumulative density function (CDF) in FIG. 3B. $\lambda$ was parametrized with spatial predictors:

$$f_{\lambda(x)}(\gamma) = \begin{cases} \lambda(x) e^{-\lambda(x) \gamma} & \text{for } \gamma \geq 0 \\ 0 & \text{for } \gamma < 0 \end{cases}$$

where x is the 2nd degree polynomial combination of the predictors d and $D_{n,g}$, with interactions only (omitting $d^2$, for instance). This modeling allows to compute the PIR density for any combination of the predictors within the ranges of the training data. The aim of the modeling is then to approach the nonlinear function $\Delta(x)$ using the observations data. To do so, an MLP regressor was used (see FIG. 3C). A Keras-based implementation was used, in which this model is trained using the Adam optimization algorithm with the negative log-likelihood as loss function:

$$\mathbb{L}(\lambda(\Omega)) = -\sum_{i \in \Omega} \log(f_{\lambda(x_i)}(\gamma_i))$$

where $\Omega$ is the set containing the indexes of the training data. k-fold cross-validation for the selection of the size was performed, and the number of the hidden layers ($n \in \{1, 2, 3\}$ and $m \in 1100, 500, 10001$ respectively) was applied using scikit-learn, with k=8. One limitation of this model is that it does not make use the previous values of the predictors. Indeed, the PIR time represents the time between two successful events: the source of the consecutive packet failures might have occurred between the two observations. However, considering that the predictors are moving transportation vehicles, their motion are smooth enough for the model to be robust to this limitation. The usage of the combination of these two python libraries allows a fast prototyping of learning strategies. The choice of the MLP regressor is motivated by its ability to capture the nonlinearity highlighted during the data exploration phase.

Another approach is presented in the following. In the following, the prediction of the PIR distribution using the spatial distribution of communicating node is shown. Previous studies show that PIR can be modelled by an exponential distribution. Moreover, IAD and surrounding communicating traffic density alter the communications system performance. In the following concept, these two premises are made use of to build a model linking the distribution of the prediction target with the variation of the spatial distribution of the nodes. Subsequently, the learning on the fly of this relationship within a full-scale system level vehicular ad hoc network (VANET) simulation featuring a five-truck HDPL was studied.

Figure 3D:
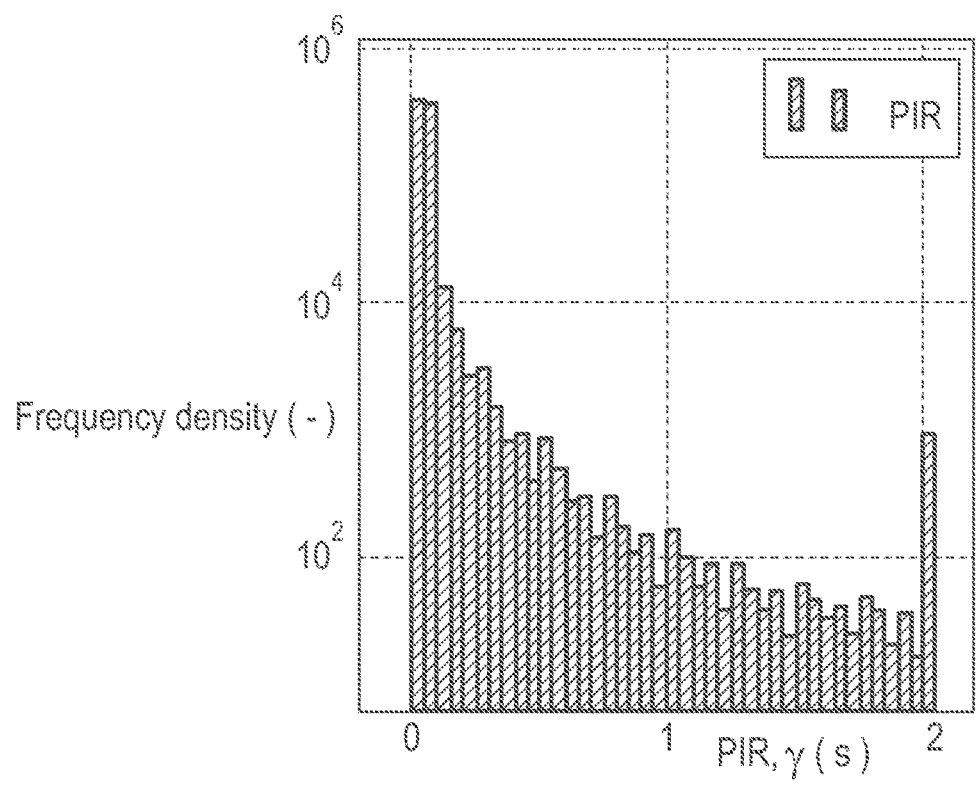
FIG. 3D shows a fourth schematic diagram related to a training of a machine-learning model.

Using the tracing capabilities of ns-3, a total of $4 \cdot 10^7$ transmission observations were gathered. Among these, $2.5 \cdot 10^6$ have a platoon member on the receiving side, and $9 \cdot 10^5$ describe intra-platoon communications. These observations comprise the observed PIR time, the source and the destination, and information about the position of the surrounding transportation vehicles. FIG. 3D shows an exemplary distribution of the PIR. The PIR time is showing a heavy-tailed distribution, motivating the further modeling of its distribution rather than simply predicting the value. Indeed, the PIR value is the result of consecutive transmission failures, which yields the low representation of high PIR values. These higher values are however of high interest for the application, as they may limit the performance of the application. As highlighted in Jornod, El Assaad, Kwoczek and Kürner: "Prediction of Packet Inter-Reception Time for Platooning using Conditional Exponential Distribution," in 16th Int. IEEE Symp. Wireless Commun. Sys. (ISWCS), 2019, pp. 265-270, the simple prediction would most likely result in a systematic prediction of the most represented value, 0.05 s. The distribution of the number of transportation vehicles however differs from previous studies. Indeed, the transportation vehicles are introduced in the scenario randomly. The transportation vehicles then follow random routes in the scenario and may accumulate, which is an experimental design choice aiming at studying the robustness of the approach to unknown or less frequent situations.

In previous studies, the importance of considering the interactions between the IAD and the number of surrounding transportation vehicles was shown. The average PIR for combinations of IAD and transportation vehicle numbers intervals was simulated. A drastic increase of the mean PIR values over 125 m was observed. Generally, it also increases along with both the number of surrounding transportation vehicles and the IAD. In a region between 80 and 100 transportation vehicles, higher values for the PIR were observed. This region, as well as the second gradient it induces, were not seen in previous results. Indeed, in this previous study, the surrounding transportation vehicles were constrained on a straight highway. In this new scenario, the spatial distribution of the surrounding transportation vehicles varies drastically more. The emergence of this new kind of pattern as well as of the second increase path from the origin to top of the ellipse is a consequence of this new distribution. This further motivates the modeling of this distribution as well as the usage of a non-linear regression model.

In the following, the modeling strategy is introduced. The first operation is the computation of the target Key Performance Indicator (KPI), the PIR time (i.e., the quality of service). The second operation is the modeling of the surrounding communication environment (i.e., the environmental model), which comprises position log pre-processing and abstraction of the environment. The third operation is the formalization of the relationship between these environment features and the distribution of our target (i.e., the generation of the training data). The fourth and final operation is the creation of a strategy for the learning of this relationship. In this example, the prediction target is the PIR time. As mentioned in the previous section, this metric is getting more and more attention in the VANET research. In the scope of HDPL, it measures the time during which a transportation vehicle cannot rely on communications for the coordination with other transportation vehicles. Moreover, modern control systems are able to cope with low update input rates thanks to prediction algorithms. They however show poorer performances with irregular input. This regularity is captured by the PIR distribution. PIR is measured from the receiver for each sources as the time difference between the reception of two messages. This KPI was studied for platoon members, for all received messages. As these messages are periodic messages, the PIR time is a multiple of the transmission period, plus or minus an experienced latency. It reflects the number of consecutive dropped messages.

In the following, the environmental features are introduced. One goal is to take the positions of all communicating transportation vehicles (i.e., the one or more active transceivers) into account. The main challenge is that the number of inputs is variable (theoretically it can span from a few transportation vehicles to an infinity if the focus is not on a specific range). Moreover, even if the scope is reduced to a specific range, most prediction methods require a fixed-size and ordered input. As a result, an adequate aggregation method for the surrounding communication environment information is used (to represent the environmental model). In G. Jornod, A. El Assaad, A. Kwoczek, and T. Kürner, "Packet inter-reception time modeling for high-density platooning in varying surrounding traffic density," in 28th IEEE Eur. Conf. Net. Commun. (EuCNC), 2019, pp. 187-192., an annulus-based environmental model was introduced (i.e., based on a circular grid), that is, e.g., shown in FIGS. 3A-3D. The core idea is to divide the space in concentric circles around the receiver and to count the number of transportation vehicles present in the formed annuli. These circles have radii that are multiples of the granularity parameter r. As a result, $A_{n,r}$ is the number of transportation vehicles contained in $\mathcal{A}_{n,r}$, which are the communicating transportation vehicles in the concentric annuli of radius difference $r \in \mathbb{R}^+$ centered around the receiver, $n \in \mathbb{N}^+$ being its index.

With this model, the impact of the spatial distribution of the surrounding transportation vehicles on the channel load is captured. The annuli are defined as:

$$\mathcal{A}_{n,r} = \{x \in \mathcal{R} \mid (n-1)r \leq \|x - x_r\|_2 < nr\}$$

$$A_{n,r} = \text{card}(a_{n,r})$$

with $\mathcal{R}$ being the set of the surrounding transportation vehicle position vectors, n the annulus index, r its granularity value and $x_r$ the position vector of the receiver. The annulus division was designed for the highway use case and the specific scenario of transportation vehicles incoming on the opposite lane.

In this example, this modeling (i.e., the environmental model) is refined by introducing a sector division. This division captures the position of the interfering nodes, especially with respect to the transmitter position, which might not detect these interferences when the IAD is relatively high. The space is divided in $n_s$ regular sectors of angle $\alpha$, which are centered on the receiver (i.e., the center point of the circular grid) and aligned with the receiver-transmitter segment. The division method may be defined as:

$$\varphi(x) = \arctan2(x_2, x_1)$$

$$\beta(x_r, x_t, x_i) = \varphi(x_t - x_r) - \varphi(x_i - x_r) - \frac{\pi}{2}$$

$$\alpha = \frac{2\pi}{n_s}$$

$$\mathcal{Q}_{m,n_s} = \{x \in R \mid (m-1)\alpha \leq \beta(x_r, x_t, x) < m\alpha\}$$

$$Q_{m,n_s} = \text{card}(Qm, ns)$$

where $\varphi$ is the function providing the angle between the positive x-axis and the vector x, $\beta$ is the function yielding the angle between the Rx-Tx and the Rx-Interference vehicle vectors. $Q_{m,n_s}$ is the number of transportation vehicle within the mth sector of angle $\alpha = 2\pi/n_s$, $\mathcal{Q}_{m,n_s}$. Finally, the offset $\pi/2$ is introduced to represent a front/back division rather than a left/right division when $n_s=2$. By combining the annulus-based and sector-based models, a so-called annulus-sector model is obtained. Its sections are defined by the intersections of the annuli and sectors. In this example, $\mathcal{D}_{n,r}^{m,n_s}$ denotes the intersection of the annulus $\mathcal{A}_{n,r}$ with the sector $\mathcal{Q}_{m,n_s}$. Similarly, the transportation vehicle sets contained in the sections and their cardinalities are defined as:

$$\mathcal{D}_{n,r}^{m,n_s} = \mathcal{A}_{n,r} \cap \mathcal{Q}_{m,n_s}$$

$$D_{n,r}^{m,n_s} = \text{card}(\mathcal{D}_{n,r}^{m,n_s})$$

It may be noted that $\mathcal{D}_{n,r}^{1,1} = \mathcal{A}_{n,r}$ and $\mathcal{D}_{1,\infty}^{m,n_s} = \mathcal{Q}_{m,n_s}$. In the example, the sectors are always oriented with respect to the transmitter and the annuli reflects the distance of the interferers. When combined with the IAD through an operation of polynomial combination of the features, this environmental model offers the possibility to account for the hidden node problem. This problem may be addressed in the modeling of the relationship between the target and the features, through a weighting process.

The set $\mathcal{R}$ represents the surrounding node positions. Two cases are differentiated, global and local knowledge. In the global knowledge case, it encompasses all nodes in the simulation and is denoted as $\mathcal{R}^9$. This set may be obtained from the transmission log and the position log. In the local knowledge case, this set is denoted as $R_t^T$ and gathers the nodes from which the receiver received a CAM in the last T s. Depending on the channel load, with low T values, the number of nodes contained in this set can be drastically reduced. This reduced set also reflects a realistic knowledge of the surrounding communication environments when no collective perception system is implemented. Again, the set may be computed using the transmission log. In the evaluation of the example, T was set to 10 s.

In the example, the prediction target is the PIR time. In the following, $\Gamma$ denotes the PIR as random variable. As shown in FIG. 3D, its distribution is heavy tailed. This feature of the distribution may prevent the usage of classical regression aiming at directly predicting the PIR. Indeed, as the lower values are heavily more represented than the larger values, a naïve prediction would result in a systematic prediction of the more represented values, which happens to be the transmission period. Instead, the distribution of the target value may be predicted, which adds an operation of distribution modeling before addressing the learning approach. In the literature, PIR is shown to be well modeled by exponential, lognormal, Weibull, gamma distributions.

The exponential distribution, which probability density function (PDF) is given as $$f_\lambda(\gamma) = \begin{cases} \lambda e^{-\lambda \gamma} & \text{for } \gamma \geq 0 \\ 0 & \text{for } \gamma < 0 \end{cases}$$

has the benefit of having a single parameter, the rate $\lambda$. The modeling task may therefore be to find an appropriate $\lambda$ that fits the collected data. In may be noted, that without the relative latency, the PIR time is a discrete variable. In M. E. Renda, G. Resta, P. Santi, F. Martelli, and A. Franchini, "IEEE 802.11 p VANets: Experimental evaluation of packet inter-reception time," Comput. Commun., vol. 75, pp. 26-38, 2016, PIR is modeled with a geometric distribution. The exponential distribution is the continuous analogue to this distribution. It allows to avoid the operation of removing the relative latencies in the collected data.

The previous subsection described the environmental features. Before that, premises of the study of the influence of the surrounding number of transportation vehicles and the IAD as well as their interactions were shown. It was shown that the number of transportation vehicles as well as the IAD jointly influences the mean PIR for CAM messages. The conditional CDF was calculated based on the number of transportation vehicles surrounding the receiver on the one hand and the IAD on the other hand. The first observation is that all provided CDFs are similar to the exponential distribution one. The second observation is that the rate $\lambda$ varies in function of the number of transportation vehicles $n_v$ and the IAD d. The rate also varies when combining intervals of two annuli division ($n_{v,1}$ and $n_{v,1}$), which shows the influence of the spatial distribution of the surrounding nodes. This motivates the parametrization of $\lambda$ with the environmental features. It is proposed to have $\lambda$ be a function of the polynomial combination of the spatial distribution features and the IAD:

$$f_{\lambda(x)}(\gamma) = \begin{cases} \lambda(x)e^{-\lambda(x)\cdot\gamma} & \text{for } \gamma \geq 0 \\ 0 & \text{for } \gamma < 0 \end{cases}$$

where x is the 2nd degree polynomial combination with interactions only (omitting $d^2$, for instance). The remaining operation is then to approximate the function $\lambda(x)$, so that $\Gamma \sim \text{Exp}(\lambda(x))$. This process is called conditional density estimation (CDE).

In the following, a learning approach is shown (e.g., for training the machine-learning model). An aim may be to provide a flexible approach that enables on the fly learning of the PIR distribution. The non-linear function $\lambda(x)$ may be approximated with a multi-layer perceptron (MLP). The interface of Keras may be leveraged and combined with scikit-learn for the hyper-parameters optimization. The choice of the number of hidden layers $n_h$ and of the number of nodes $n_n$ within the layers is then automated with a cross-validated grid search. This model (i.e., the machine-learning model) is trained using the Adam optimization algorithm with the negative log-likelihood as loss function:

$$\mathbb{L}(\lambda(\Omega_1)) = -\sum_{i \in \Omega_1} \log(f_{\lambda(x_i)}(\gamma_i))$$

where $\Omega_1$ is the set of the training data. The MLP is input the polynomial combination of the features (i.e., a polynomial combination being based on the environmental model) and outputs the rate $\lambda$ (which may be used to determine the probability distribution of the quality of service). FIG. 3C illustrates this process for an annulus-based environmental model. The learning model has three parameters, the learning rate LR, the number of hidden layers $n_h$ and the number of neurons in each layer $n_n$. For example, a homogeneous number of neurons may be assumed in each layer. The performance of the annulus-sector models may be compared depending on the parameters r and $n_s$. This is done by using MLP regressor on the data collected by the platoon members during the first 30 min (i.e., the plurality of environmental models and the corresponding quality of service). A k-fold cross validation strategy was used for the split between training and testing sets. This strategy is applied on each evaluated model and reported as the mean performance. This model selection operation may also encompass the three learning parameters (learning rate, and size and number of layers). The best performing model was reported for each combination of r and $n_s$. This best performing model was then used on the total simulation duration. The MLP regressor was iteratively trained with the data collected by a training platoon member. In this training process, the weights of the regressor are updated at each iteration. The performance of the models was evaluated on the testing data, which comprises all observations collected by the remaining trucks within the simulation duration. The log-likelihood presented above was used as loss function for the training of the MLP model.

The evaluation found, that the best-performing annulus-sector model parameters were r=30, $n_s$=8, LR=0.0001, $n_n$=1000 and $n_h$=9 for the global scope, and r=60, $n_s$=4, LR=0.0001, $n_n$=500 and $n_h$=10 for the local scope. The following values were evaluated: r=n30 m, with n∈{1, 2, 3, 4, 6, 13}, $n_s \in \{1, 2, 4, 8\}$, LR={0.1, 0.01, 0.001, 0.0001}, $n_n$={50, 100, 500, 1000} and $n_h$={2, 3, . . . , 10}.

Using the results of the previous model comparison, the selected model was trained on-line during the whole simulation period. The fitted model is updated each time the training node receives a transmission. The performance of the model on two data sets was performed: (i) the data collected until the reception time for the node of interest, that is a subset of the training set; (ii) and on the whole data collected by other platoon members.

The evaluation showed that even after convergence, the model may keep learning to improve its robustness.

More details and facets of the concept are mentioned in connection with the proposed concept or one or more examples described above or below (e.g., FIGS. 1A-2B). The concept may comprise one or more additional optional features corresponding to one or more facets of the proposed concept or one or more examples described above or below.

As already mentioned, in exemplary embodiments the respective methods may be implemented as computer programs or codes, which can be executed on a respective hardware. Hence, another disclosed embodiment is a computer program having a program code for performing at least one of the above methods, when the computer program is executed on a computer, a processor, or a programmable hardware component. A further disclosed embodiment is a computer readable storage medium storing instructions which, when executed by a computer, processor, or programmable hardware component, cause the computer to implement one of the methods described herein.

A person of skill in the art would readily recognize that operations of various above-described methods can be performed by programmed computers, for example, positions of slots may be determined or calculated. Herein, some disclosed embodiments are also intended to cover program storage devices, e.g., digital data storage media, which are machine or computer readable and encode machine-executable or computer-executable programs of instructions where the instructions perform some or all of the operations of methods described herein. The program storage devices may be, e.g., digital memories, magnetic storage media such as magnetic disks and magnetic tapes, hard drives, or optically readable digital data storage media. The exemplary embodiments are also intended to cover computers programmed to perform the operations of methods described herein or (field) programmable logic arrays ((F)PLAs) or (field) programmable gate arrays ((F)PGAs), programmed to perform the operations of the above-described methods.

The description and drawings merely illustrate the principles of the disclosure. It will thus be appreciated that those skilled in the art will be able to devise various arrangements that, although not explicitly described or shown herein, embody the principles of the disclosure and are included within its spirit and scope. Furthermore, all examples recited herein are principally intended expressly to be only for pedagogical purposes to aid the reader in understanding the principles of the disclosure and the concepts contributed to furthering the art, and are to be construed as being without limitation to such specifically recited examples and conditions. Moreover, all statements herein reciting principles and embodiments of the disclosure, as well as specific examples thereof, are intended to encompass equivalents thereof.

When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, Digital Signal Processor (DSP) hardware, network processor, application specific integrated circuit (ASIC), field programmable gate array (FPGA), read only memory (ROM) for storing software, random access memory (RAM), and non-volatile storage. Other hardware, conventional or custom, may also be included. Their function may be carried out through the operation of program logic, through dedicated logic, through the interaction of program control and dedicated logic, or even manually, the particular technique being selectable by the implementer as more specifically understood from the context.

It should be appreciated by those skilled in the art that any block diagrams herein represent conceptual views of illustrative circuitry embodying the principles of the disclosure. Similarly, it will be appreciated that any flow charts, flow diagrams, state transition diagrams, pseudo code, and the like represent various processes which may be substantially represented in computer readable medium and so executed by a computer or processor, whether or not such computer or processor is explicitly shown.

Furthermore, the following claims are hereby incorporated into the detailed description, where each claim may stand on its own as a separate exemplary embodiment. While each claim may stand on its own as a separate exemplary embodiment, it is to be noted that—although a dependent claim may refer in the claims to a specific combination with one or more other claims—other disclosed embodiments may also include a combination of the dependent claim with the subject matter of each other dependent claim. Such combinations are proposed herein unless it is stated that a specific combination is not intended. Furthermore, it is intended to include also features of a claim to any other independent claim even if this claim is not directly made dependent to the independent claim.

It is further to be noted that methods disclosed in the specification or in the claims may be implemented by a device having methods or mechanisms for performing each of the respective operations of these methods.

LIST OF REFERENCE SIGNS

10 Apparatus
12 One or more interfaces
14 Control module
100 Mobile transceiver
102 Further mobile transceiver
104 One or more active transceivers
110 Determining a plurality of environmental models
120 Determining a predicted future environmental model
120 Performing time-series projection
130 Predicting a future quality of service
135 Using the predicted future environmental model as input for a machine-learning model
140 Determining a quality of service
145 Training the machine-learning model

The invention claimed is:

1. An apparatus for predicting a future quality of service of a wireless communication link between a mobile transceiver and a further mobile transceiver, the apparatus comprising:
one or more interfaces for communicating in a mobile communication system; and a control module configured to predict the future quality of service of the wireless communication link between the mobile transceiver and the further mobile transceiver by:
determining a plurality of environmental models of one or more active transceivers in the environment of the mobile transceiver over a plurality of points in time;
determining a predicted future environmental model of the one or more active transceivers at a point in time of the future using a time-series projection on the plurality of environmental models which predicts a development of one or more numerical values representative of at least one property of an environmental model of the plurality of environmental models over the plurality of points in time based on historic data of the one or more numerical values; and
predicting the future quality of service of the wireless communication link for point in time of the future using a machine-learning model,
wherein the machine-learning model is trained to provide information on a predicted quality of service for a given environmental model, and
wherein the predicted future environmental model is used as input to the machine-learning model.

2. The apparatus of claim 1, wherein the time-series projection is performed based on a statistical fitting function or based on a time autocorrelation function.

3. The apparatus of claim 1, wherein the time-series projection is performed using a further machine-learning model.

4. The apparatus of claim 1, wherein the time-series projection is determined so that a progression of the environmental models towards the predicted future environmental model is predicted.

5. The apparatus of claim 1, wherein the time-series projection yields the predicted future environmental model, with the future quality of service being predicted based on the predicted future environmental model.

6. The apparatus of claim 1, wherein the future quality of service of the wireless communication link is predicted for at least two points in time of the future.

7. The apparatus of claim 6, wherein the future quality of service of the wireless communication link is predicted for the at least two points in time of the future by determining the predicted future environmental model of the one or more active transceivers at the at least two points in time of the future, and using the predicted future environmental model of the one or more active transceivers at the at least two points in time of the future as inputs for the machine-learning model.

8. The apparatus of claim 1, wherein the controller is further configured to determine a quality of service of the wireless communication link at the plurality of points in time, and training the machine-learning model using the plurality of environmental models at the plurality of points of time as training input and the quality of service of the wireless communication link at the corresponding plurality of points in time as training output of the training of the machine-learning model.

9. The apparatus of claim 1, wherein the machine-learning model is trained to implement a regression algorithm.

10. The apparatus of claim 1, wherein the machine-learning model is trained to provide a probability distribution on the predicted quality of service for a given environmental model.

11. The apparatus of claim 1, wherein the one or more active transceivers are placed on a grid within the environmental model, the grid comprising a plurality of adjoining cells, wherein the one or more active transceivers are aggregated per cell within the grid.

12. The apparatus of claim 11, wherein the grid is a circular grid.

13. The apparatus of claim 1, wherein the predicted quality of service relates to at least one of a packet inter-reception time, a packet error rate, a latency and a data rate.

14. A method for predicting a future quality of service of a wireless communication link between a mobile transceiver and a further mobile transceiver, the method comprising:
determining a plurality of environmental models of one or more active transceivers in the environment of the mobile transceiver over a plurality of points in time;
determining a predicted future environmental model of the one or more active transceivers at a point in time of the future using a time-series projection on the plurality of environmental models which predicts a development of one or more numerical values representative of at least one property of an environmental model of the plurality of environmental models over the plurality of points in time based on historic data of the one or more numerical values; and
predicting the future quality of service of the wireless communication link for point in time of the future using a machine-learning model,
wherein the machine-learning model is trained to provide information on a predicted quality of service for a given environmental model, and
wherein the predicted future environmental model is used as input to the machine-learning model.

15. The method of claim 14, wherein the time-series projection is performed based on a statistical fitting function or based on a time autocorrelation function.

16. The method of claim 14, wherein the time-series projection is performed using a further machine-learning model.

17. The method of claim 14, wherein the time-series projection is determined so that a progression of the environmental models towards the predicted future environmental model is predicted.

18. The method of claim 14, wherein the time-series projection yields the predicted future environmental model, with the future quality of service being predicted based on the predicted future environmental model.

19. The method of claim 14, wherein the future quality of service of the wireless communication link is predicted for at least two points in time of the future.

20. The method of claim 19, wherein the future quality of service of the wireless communication link is predicted for the at least two points in time of the future by determining the predicted future environmental model of the one or more active transceivers at the at least two points in time of the future, and using the predicted future environmental model of the one or more active transceivers at the at least two points in time of the future as inputs for the machine-learning model.

21. The method of claim 14, further comprising determining a quality of service of the wireless communication link at the plurality of points in time, and training the machine-learning model using the plurality of environmental models at the plurality of points of time as training input and the quality of service of the wireless communication link at the corresponding plurality of points in time as training output of the training of the machine-learning model.

22. The method of claim 14, wherein the machine-learning model is trained to implement a regression algorithm.

23. The method of claim 14, wherein the machine-learning model is trained to provide a probability distribution on the predicted quality of service for a given environmental model.

24. The method of claim 14, wherein the one or more active transceivers are placed on a grid within the environmental model, the grid comprising a plurality of adjoining cells, wherein the one or more active transceivers are aggregated per cell within the grid.

25. The method of claim 24, wherein the grid is a circular grid.

26. The method of claim 14, wherein the predicted quality of service relates to at least one of a packet inter-reception time, a packet error rate, a latency and a data rate.

27. A non-transitory computer readable medium including a computer program having a program code for performing the method of claim 14, when the computer program is executed on a computer, a processor, or a programmable hardware component.

* * * * *